(12) United States Patent
Li

(10) Patent No.: US 12,335,924 B2
(45) Date of Patent: Jun. 17, 2025

(54) METHOD AND APPARATUS FOR LATENCY HANDLING OF SIDELINK REFERENCE SIGNAL TRANSMISSION IN A WIRELESS COMMUNICATION SYSTEM

(71) Applicant: ASUS Technology Licensing Inc., Taipei (TW)

(72) Inventor: Ming-Che Li, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/896,354

(22) Filed: Sep. 25, 2024

(65) Prior Publication Data

US 2025/0119876 A1 Apr. 10, 2025

Related U.S. Application Data

(60) Provisional application No. 63/542,988, filed on Oct. 6, 2023.

(51) Int. Cl.
*H04W 72/02* (2009.01)
*H04L 5/00* (2006.01)
*H04W 72/40* (2023.01)

(52) U.S. Cl.
CPC ........... *H04W 72/02* (2013.01); *H04L 5/0051* (2013.01); *H04W 72/40* (2023.01)

(58) Field of Classification Search
CPC ...... H04W 72/02; H04W 72/40; H04L 5/0051
See application file for complete search history.

(56) References Cited

U.S. PATENT DOCUMENTS

2023/0284174 A1   9/2023  Ko
2024/0080868 A1*  3/2024  Selvanesan ........... H04W 72/40

OTHER PUBLICATIONS

Moderator (Qualcomm); Moderator Summary #1 on resource allocation for SL PRS; 3GPP TSG RAN WG1 #112; R1-23xxxxx; Feb. 27-Mar. 3, 2023; 46 pages.

(Continued)

*Primary Examiner* — Rhonda L Murphy
(74) *Attorney, Agent, or Firm* — Skaar Ulbrich Macari, P.A.

(57) ABSTRACT

Methods, systems, and apparatuses are provided for latency handling of sidelink reference signal transmission in a wireless communication system, wherein a method comprises receiving or having a configuration of a first sidelink resource pool for sidelink data transmission and sidelink reference signal transmission, performing a first sensing-based resource selection, triggered or requested in a first timing, for selecting one or more first sidelink resources in the first sidelink resource pool, determining a first set of candidate resources within a first time interval, determining a first subset of candidate resources after excluding some candidate resources from the first set of candidate resources based on one or more sensing results, selecting the one or more first sidelink resources from the first subset of candidate resources according to at least a second remaining packet delay budget and a remaining delay budget associated with a first sidelink reference signal, and performing a first sidelink data transmission and transmission of the first sidelink reference signal on a first sidelink resource of the selected one or more first sidelink resources.

20 Claims, 6 Drawing Sheets

(56) References Cited

OTHER PUBLICATIONS

Moderator (Qualcomm); Moderator Summary #3 on resource allocation for SL PRS; 3GPP TSG RAN WG1 #112bis-e; R1-230xxxx; Apr. 17-Apr. 26, 2023; 112 pages.

Huawei, HiSilicon; Summary of [Post123][414][POS] Rel-18 positioning MAC CRs (Huawei); 3GPP TSG-RAN WG2 Meeting #123; R2-230; Aug. 21-Aug. 25, 2023; 14 pages.

* cited by examiner

METHOD AND APPARATUS FOR LATENCY HANDLING OF SIDELINK REFERENCE SIGNAL TRANSMISSION IN A WIRELESS COMMUNICATION SYSTEM

CROSS-REFERENCE TO RELATED APPLICATIONS

The present Application claims priority to and the benefit of U.S. Provisional Patent Application Ser. No. 63/542,988, filed Oct. 6, 2023, which is fully incorporated herein by reference.

FIELD

This disclosure generally relates to wireless communication networks and, more particularly, to a method and apparatus for latency handling of sidelink reference signal transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for latency handling of sidelink reference signal transmission in a wireless communication system. As such, when a device or User Equipment (UE) performs sensing-based resource selection in a shared resource pool, the latency requirement of Sidelink (SL) Positioning Reference Signals (PRSs) can be satisfied.

In various embodiments, a method for a first device in a wireless communication system comprises receiving or having a configuration of a first sidelink resource pool for sidelink data transmission and sidelink reference signal transmission, performing a first sensing-based resource selection, triggered or requested in a first timing, for selecting one or more first sidelink resources in the first sidelink resource pool, determining a first set of candidate resources within a first time interval, wherein the first time interval is determined based on at least a first remaining packet delay budget, determining a first subset of candidate resources after excluding some candidate resources from the first set of candidate resources based on one or more sensing results, selecting the one or more first sidelink resources from the first subset of candidate resources according to at least a second remaining packet delay budget and a remaining delay budget associated with a first sidelink reference signal, and performing a first sidelink data transmission and transmission of the first sidelink reference signal on a first sidelink resource of the selected one or more first sidelink resources.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.213 V18.0.0 (2023-09) 3GPP; TSG RAN; NR; Physical layer procedures for control (Release 18); [2] 3GPP TS 38.214 V18.0.0 (2023 September) 3GPP; TSG RAN; NR; Physical layer procedures for data (Release 18); [3] 3GPP TS 38.214 V17.6.0 (2023 September) 3GPP; TSG RAN; NR; Physical layer procedures for data (Release 17); [4] RP-231460, "New WID on Expanded and Improved NR Positioning", Intel; [5] RAN1 Chair's Notes of 3GPP TSG RAN WG1 #112bis; [6] RAN1 Chair's Notes of 3GPP TSG RAN WG1 #113; and [7] RAN1 Chair's Notes of 3GPP TSG RAN WG1 #114. The standards and documents listed above are hereby expressly and fully incorporated herein by reference in their entirety.

Figure 1:
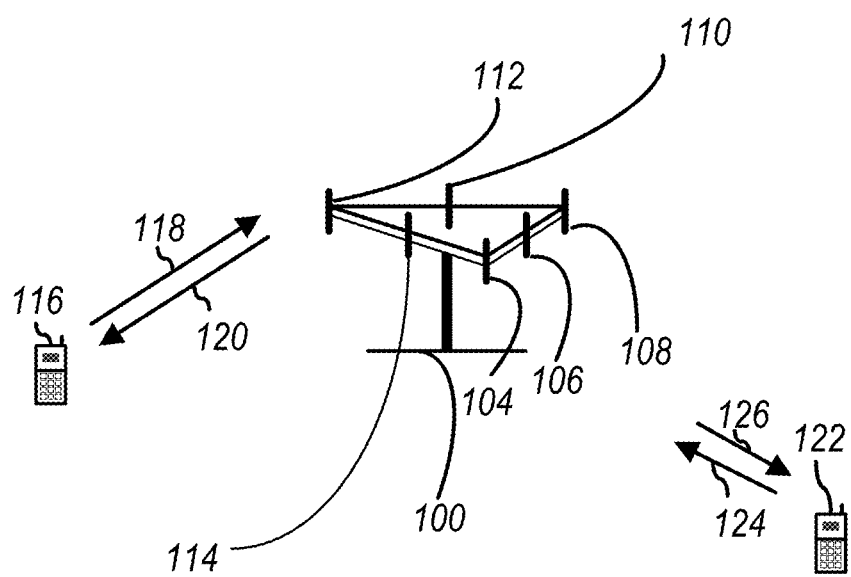
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
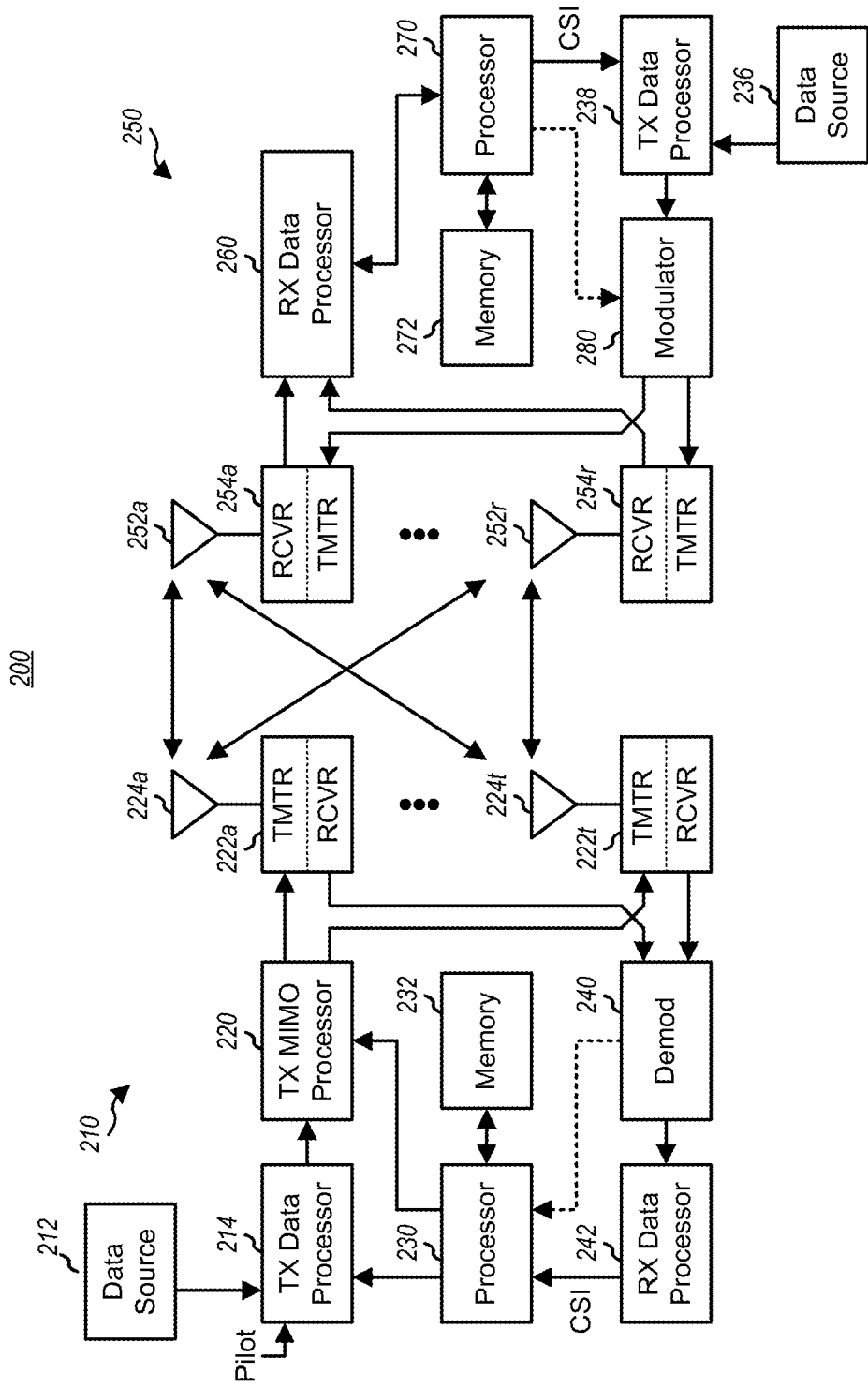
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
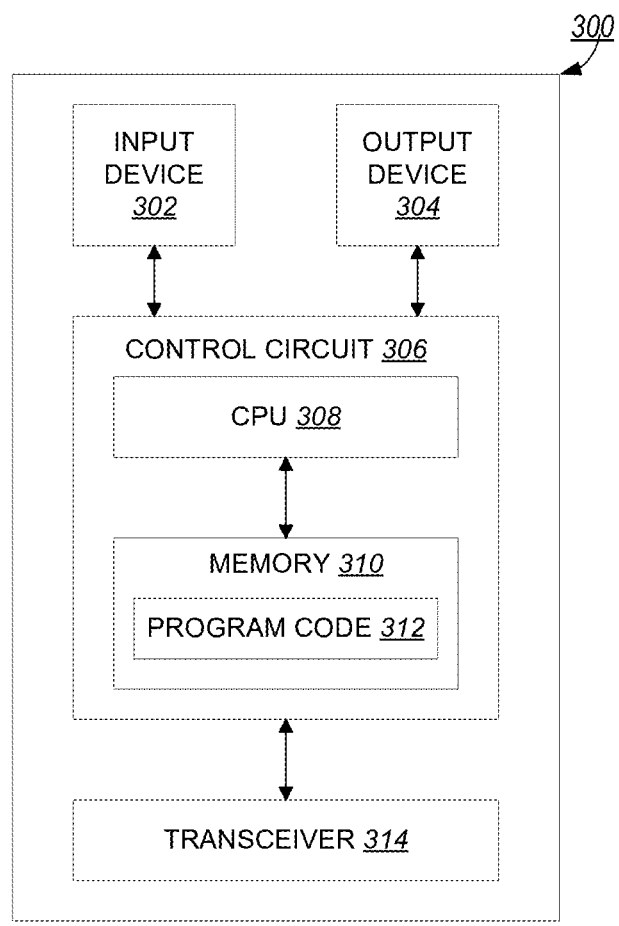
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
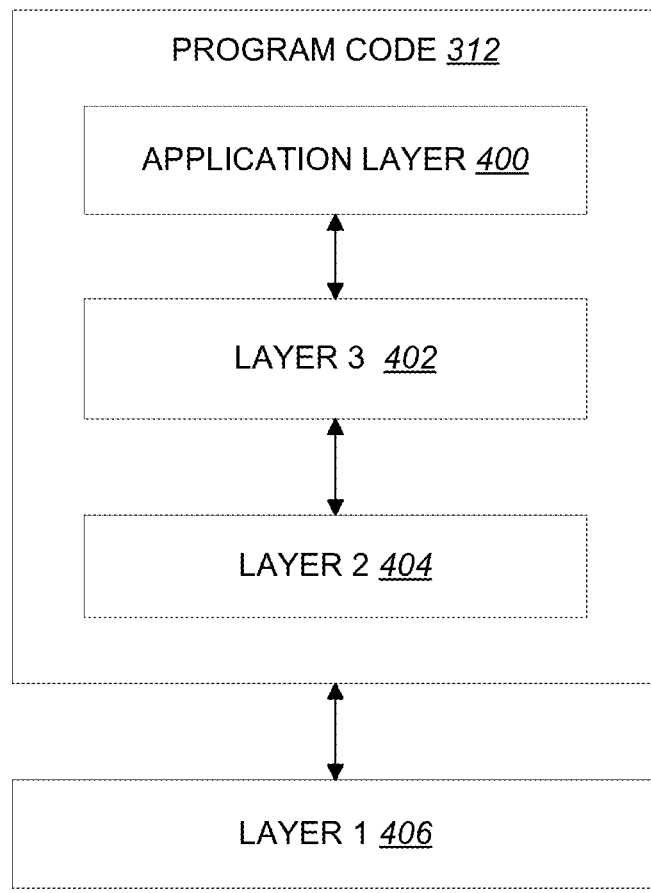
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In TS 38.213 ([1]3GPP TS 38.213 V18.0.0 (2023-09) 3GPP; TSG RAN; NR; Physical layer procedures for control (Release 18)), SL related procedure for control is specified.
****************************** QUOTATION [1] START **********************************

16 UE Procedures for Sidelink

A UE is provided by SL-BWP-Config or SL-BWP-ConfigCommon a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by sl-TimeResource and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols.

. . .

16.4 UE Procedure for Transmitting PSCCH

A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB index of the lowest sub-channel index, in an RB-set with a lowest index if applicable, of the associated PSSCH for a PSCCH transmission with a SCI format 1-A.

. . . A UE that transmits a PSCCH with SCI format 1-A using sidelink resource allocation mode 2 [6, TS 38.214] sets

. . .

16.4a UE Procedure for Transmitting PSCCH in Dedicated Resource Pool for SL PRS

For a resource pool dedicated for SL PRS transmissions, a UE can be provided a number of symbols in the resource pool, by sl-TimeResourcePSCCH, starting from a second symbol that is available for SL transmissions in a slot, and a number of PRBs in the resource pool, by sl-FreqResourcePSCCH, for a PSCCH transmission with a SCI format 1-B.

A UE that transmits a PSCCH with SCI format 1-B using SL PRS resource allocation scheme 2 [6, TS 38.214] sets
****************************** QUOTATION [1] END **********************************

In TS 38.214 ([2]3GPP TS 38.214 V18.0.0 (2023-09) 3GPP; TSG RAN; NR; Physical layer procedures for data (Release 18)), SL related procedure for data is specified.
****************************** QUOTATION [2] START **********************************

8 Physical Sidelink Shared Channel Related Procedures

A UE can be configured by higher layers with one or more sidelink resource pools. A sidelink resource pool can be for transmission of PSSCH, as described in Clause 8.1, and/or SL PRS, as described in Clause 8.2.4, or for reception of PSSCH, as described in Clause 8.3, and/or SL PRS, as described in Clause 8.4.4, and can be associated with either sidelink resource allocation mode 1 or sidelink resource allocation mode 2.

A sidelink resource pool which can be used for transmission of both SL PRS and PSSCH will be referred to as shared resource pool.

A sidelink resource pool which can be used for transmission of SL PRS and cannot be used for transmission of PSSCH will be referred to as dedicated SL PRS resource pool.

> ... The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$,
>
> the slot index is relative to slot #0 of the radio frame corresponding to SFN 0 of the serving cell or DFN 0,
>
> the set includes all the slots except the following slots,
>
> $N_{S-SSB}$ slots in which S-SS/PSBCH block (S-SSB) or additional transmission occasion for S-SSB is configured,
>
> $N_{nonSL}$ slots in each of which at least one of Y-th, (Y+1)-th, ..., (Y+X−1)-th OFDM symbols are not semi-statically configured as UL as per the higher layer parameter tdd-UL-DL-ConfigurationCommon of the serving cell if provided or sl-TDD-Configuration if provided or sl-TDD-Config of the received PSBCH if provided, where Y and X are set by the higher layer parameters sl-StartSymbol and sl-LengthSymbols, respectively.
>
> The reserved slots which are determined by the following steps.
>
> 1) the remaining slots excluding $N_{S-SSB}$ slots and $N_{nonSL}$ slots from the set of all the slots are denoted by $(l_0, l_1, \ldots, l_{(10240 \times 2^\mu - N_{S-SSB} - N_{nonSL} - 1)})$ arranged in increasing order of slot index.
>
> 2) a slot $l_r$ $(0 \leq r < 10240 \times 2^\mu - N_{S-SSB} - N_{nonSL})$ belongs to the reserved slots if
>
> $$r = \left\lfloor \frac{m \cdot (10240 \times 2^\mu - N_{S-SSB} - N_{nonSL})}{N_{reserved}} \right\rfloor,$$
>
> here $m = 0, 1, \ldots, N_{reserved} - 1$ and $N_{reserved} = (10240 \times 2^\mu - N_{S-SSB} - N_{nonSL}) \bmod L_{bitmap}$ where $L_{bitmap}$ denotes the length of bitmap configured by higher layers.

> The slots in the set are arranged in increasing order of slot index.

The UE determines the set of logical slots assigned to a sidelink resource pool as follows:

> a bitmap $(b_0, b_1, \ldots, b_{L_{bitmap}-1})$ associated with the resource pool is used where $L_{bitmap}$ the length of the bitmap is configured by higher layers.
>
> a slot $t_k^{SL}$ $(0 \leq k < 10240 \times 2^\mu - N_{S-SSB} - N_{nonSL} - N_{reserved})$ belongs to the set if $b_{k'}=1$ where $k'=k \bmod L_{bitmap}$.
>
> The slots in the set are re-indexed such that the subscripts i of the remaining slots $t'^{SL}_i$ are successive $\{0, 1, \ldots, T'_{max}-1\}$ where $T'_{max}$ is the number of the slots remaining in the set.

The UE determines the set of resource blocks assigned to a sidelink resource pool as follows:

> The resource block pool consists of $N_{PRB}$ PRBs.

...

8.1 UE Procedure for Transmitting the Physical Sidelink Shared Channel

Each PSSCH transmission is associated with an PSCCH transmission.

That PSCCH transmission carries the 1st stage of the SCI associated with the PSSCH transmission; the 2nd stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot > one transport block is transmitted with up to two layers;
>
> The number of layers (v) is determined according to the 'Number of DMRS port' field in the SCI;
>
> The set of consecutive symbols within the slot for transmission of the PSSCH is determined according to clause 8.1.2.1;
>
> The set of contiguous or interlaced resource blocks for transmission of the PSSCH is determined according to clause 8.1.2.2;
>
> ...

8.1.1 Transmission Schemes

Only one transmission scheme is defined for the PSSCH and is used for all PSSCH transmissions.

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

> The UE shall not transmit PSSCH in symbols which are not configured for sidelink . . . .
>
> The UE shall not transmit PSSCH in symbols which are configured for use by PSFCH, if PSFCH is configured in this slot.
>
> The UE shall not transmit PSSCH in the last symbol configured for sidelink.
>
> The UE shall not transmit PSSCH in the symbol immediately preceding the symbols which are configured for use by PSFCH, if PSFCH is configured in this slot.

...

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

...

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

> the resource pool from which the resources are to be reported;
>
> L1 priority, $prio_{TX}$;
>
> the remaining packet delay budget;
>
> ...
>
> the number of sub-channels to be used for the PSSCH/PSCCH transmission in a slot, $L_{subCH}$;
>
> optionally, the resource reservation interval, $P_{rsvp\_TX}$, in units of msec.

if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r_0', r_1', r_2', \ldots)$ which may be subject to pre-emption. it is up to UE implementation to determine the subset of resources as requested by higher layers before or after the slot $r_i''-T_3$, where $r_i''$ is the slot with the smallest slot index among $(r_0, r_1, r_2, \ldots)$ and $(r_0', r_1', r_2', \ldots)$, and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

Optionally, the indication of resource selection mechanism.

. . .

The following higher layer parameters affect this procedure:

sl-SelectionWindowList: internal parameter $T_{2min}$ is set to the corresponding value from higher layer parameter sl-SelectionWindowList for the given value of $prio_{TX}$.

sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j=prio_{TX}$.

sl-RS-ForSensing selects if the UE uses the PSSCH-RSRP or PSCCH-RSRP measurement, as defined in clause 8.4.2.1.

sl-ResourceReservePeriodList sl-Sensing Window: internal parameter $T_0$ is defined as the number of slots corresponding to sl-Sensing Window msec sl-TxPercentageList: internal parameter X for a given $prio_{TX}$ is defined as sl-TxPercentageList ($prio_{TX}$) converted from percentage to ratio

. . .

The resource reservation interval, $P_{rsvp\_TX}$, if provided, is converted from units of msec to units of logical slots, resulting in $P_{rsvp\_TX}'$ according to clause 8.1.7.

When the resource pool is (pre-)configured with sl-AllowedResourceSelectionConfig including full sensing, and full sensing is configured in the UE by higher layers, the UE performs full sensing.

When periodic reservation for another TB (sl-MultiReserveResource) is enabled for the resource pool, the resource pool is (pre-)configured with sl-AllowedResourceSelectionConfig including partial sensing, and partial sensing is configured by higher layer, the UE performs periodic-based partial sensing, unless other conditions state otherwise in the specification.

When a UE is triggered by higher layer to report resources for resource (re-)selection in a mode 2 Tx pool, the resource pool is (pre-)configured with sl-AllowedResourceSelectionConfig including partial sensing, and partial sensing is configured by higher layer, the UE performs contiguous partial sensing, unless stated otherwise in the specification.

Notation:

$(t'_0{}^{SL}, t'_1{}^{SL}, t'_2{}^{SL}, \ldots)$ denotes the set of slots which belongs to the sidelink resource pool and is defined in Clause 8.

For dynamic co-channel coexistence of LTE sidelink and NR sidelink, $(t_0^{LTESL}, t_1^{LTESL}, \ldots, t_{T_{max}-1}^{LTESL})$ denotes the set of subframes that may belong to an LTE sidelink resource pool as defined in clause 14.1.5 of [19, TS36.213].

The following steps are used:
1) . . .

If the higher layer parameter transmissionStructureForPSCCHandPSSCH is not provided, a candidate single-slot resource for transmission $R_{x,y}$ is defined as a set of $L_{subCH}$ contiguous sub-channels with sub-channel x+j in slot $t'_y{}^{SL}$ where j=0, . . . , $L_{subCH}$-1. The UE shall assume that any set of $L_{subCH}$ contiguous sub-channels or $L_{subCH}$ contiguous sub-channels in $L_{RBset}$ contiguous RB sets included in the corresponding resource pool within the time interval $[n+T_1, n+T_2]$ correspond to one candidate single-slot resource for UE performing full sensing, in a set of Y candidate slots within the time interval $[n+T_1, n+T_2]$ correspond to one candidate single-slot resource or one candidate multi-slot resource for UE performing periodic-based partial sensing together with contiguous partial sensing and resource (re)selection triggered by periodic transmission ($P_{rsvp\_TX} \neq 0$), or in a set of Y' candidate slots within the time interval $[n+T_1, n+T_2]$ correspond to one candidate single-slot resource for UE performing at least contiguous partial sensing and resource (re)selection triggered by aperiodic transmission ($P_{rsvp\_TX}=0$), where selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

Y is selected by UE where $Y \geq Y_{min}$.

. . .

The total number of remaining candidate single-slot resources or candidate multi-slot resources is denoted by $M_{total}$.

2) The sensing window is defined by the range of slots $[n-T_0, n-T_{proc,0}^{SL})$, when the UE performs full sensing, where $T_0$ is defined above and $T_{proc,0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

. . .

3) The internal parameter $Th(p_i, p_j)$ is set to the corresponding value of RSRP threshold indicated by the i-th field in sl-Thres-RSRP-List, where $i=p_i+(p_j-1)*8$.

. . .

4) The set $S_A$ is initialized to the set of all the candidate single-slot resources or candidate multi-slot resources.

5) The UE shall exclude any candidate single-slot resource $R_{x,y}$ or $R_{x,y,z}$, or candidate multi-slot resource $R_{x,y}$ or $R_{x,y,z}$ from the set $S_A$ if it meets all the following conditions:

the UE has not monitored slot $t'_m{}^{SL}$ in Step 2.

for any periodicity value allowed by the higher layer parameter sl-ResourceReservePeriodList and a hypothetical SCI format 1-A received in slot $t'_m{}^{SL}$ with 'Resource reservation period' field set to that periodicity value and indicating all subchannels of the resource pool in this slot, condition c in step 6 would be met.

...

5a) If the number of candidate single-slot resources $R_{x,y}$ or $R_{x,y,z}$ or the number of candidate multi-slot resource $R_{x,y}$ or $R_{x,y,z}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ or $R_{x,y,z}$, or candidate multi-slot resource $R_{x,y}$, or $R_{x,y,z}$ from the set $S_A$ if it meets all the following conditions:

a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than $Th(prio_{RX}, prio_{TX})$;

c) the SCI format received in slot $t'^{SL}_m$ or the same SCI format which, if and only if the 'Resource reservation period' field is present in the received SCI format 1-A, is assumed to be received in slot(s) $t'_{m+q \times P'_{rsvp\_RX}}$ determines according to clause 8.1.5 the set of resource blocks and slots which overlaps with $R_{x,y+j \times P'_{rsvp\_TX}}$ for $q=1, 2, \ldots, Q$ and $j=0, 1, \ldots, C_{resel}-1$. Here, $P'_{rsvp\_Rx}$ is $P_{rsvp\_Rx}$ converted to units of logical slots according to clause 8.1.7, $$Q = \left\lceil \frac{T_{scal}}{P_{rsvp\_RX}} \right\rceil$$

if $P_{rsvp\_RX} < T_{scal}$ and $n'-m \leq P'_{rsvp\_RX}$, where if the UE is configured with full sensing by its higher layer, $t'^{SL}_n = n$ if slot n belongs to the set $(t'^{SL}_0, t'^{SL}_1, \ldots, t'^{SL}_{T'_{max}-1})$, otherwise slot $t'^{SL}_n$ is the first slot after slot n belonging to the set $(t'^{SL}_0, t'^{SL}_1, \ldots, t'^{SL}_{T'_{max}-1})$; If UE is configured with partial sensing by its higher layer, $t'^{SL}_n = t'^{SL}_{y_i} - T^{SL}_{proc,1}$ if slot $t'^{SL}_{y_i} - T^{SL}_{proc,1}$ belongs to the set $(t'^{SL}_0, t'^{SL}_1, \ldots, t'^{SL}_{T'_{max}-1})$, otherwise, slot $t'^{SL}_n$ is the first slot after slot $t'^{SL}_{y_i} - T^{SL}_{proc,1}$ belonging to the set $(t'^{SL}_0, t'^{SL}_1, \ldots, t'^{SL}_{T'_{max}-1})$. Otherwise Q=1. If the UE is configured with full sensing by its higher layer, $T_{scal}$ is set to selection window size $T_2$ converted to units of msec. If UE is configured with partial sensing by its higher layer, $T_{scal} = t'^{SL}_{y_L} - (t'^{SL}_{y_i} - T^{SL}_{proc,1})$ shall be converted to milliseconds, where slot $t'^{SL}_{y_L}$ is the last slot of the Y or Y' candidate slots. The slot $t'^{SL}_{y_i}$ is the first slot of the selected/remaining set of Y or Y' candidate slots.

...

7) If the number of candidate single-slot resources or candidate multi-slot resources remaining in the set $S_A$ is smaller than $X \cdot M_{total}$, then $Th(p_i, p_j)$ [and $ThLTE(p_i, p_j)$, if set,] is increased by 3 dB for each priority value $(p_i, p_j)$ and the procedure continues with step 4.

7a) If sidelink DRX active time of RX UE is provided by the higher layer and there is no candidate single-slot or multi-slot resource remained within the sidelink DRX active time in the set $S_A$, the UE based on its implementation additionally selects and includes at least one candidate single-slot resources within the sidelink DRX active time in the set $S_A$.

The UE shall report set $S_A$ to higher layers.

If a resource $r_i$ from the set $(r_0, r_1, r_2, \ldots)$ is not a member of $S_A$, then the UE shall report re-evaluation of the resource $r_i$ to higher layers.

If a resource $r_i'$ from the set $(r_0', r_1', r_2', \ldots)$ meets the conditions below then the UE shall report pre-emption of the resource $r_i'$ to higher layers.

...

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:

if N=1
  TRIV=0
elseif N=2
  TRIV=$t_1$
else
  if $(t_2-t_1-1) \leq 15$
    TRIV=$30(t_2-t_1-1)+t_1+31$
  else
    TRIV=$30(31-t_2+t_1)+62-t_1$
  end if
end if where the first resource is in the slot where SCI format 1-A was received, and $t_i$ denotes i-th resource time offset in logical slots of a resource pool with respect to the first resource where for N=2, $1 \leq t_1 \leq 31$; and for N=3, $1 \leq t_1 \leq 30$, $t_1 < t_2 \leq 31$.

The starting sub-channel $n_{subCH,0}^{start}$ of the first resource is determined according to clause 8.1.2.2. The number of contiguously allocated sub-channels for each of the N resources $L_{subCH} \geq 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV = n_{subCH,1}^{start} + \Sigma_{i=1}^{L^{subCH}-1}(N_{subchannel}^{SL}+1-i)$$

If sl-MaxNumPerReserve is 3 then $$FRIV = n_{subCH,1}^{start} + n_{subCH,2}^{start} \cdot (N_{subchannel}^{SL}+1-L_{subCH}) + \Sigma_{i=1}^{L^{subCH}-1}(N_{subchannel}^{SL}+1-i)^2$$

where
  $n_{subCH,1}^{start}$ denotes the starting sub-channel index for the second resource
  $n_{subCH,2}^{start}$ denotes the starting sub-channel index for the third resource
  $N_{subchannel}^{SL}$ is the number of sub-channels in a resource pool, or if the higher layer parameter transmissionStructureForPSCCHandPSSCH is set to 'interlaceRB', the number of sub-channels in each RB set, provided according to the higher layer parameter sl-NumSubchannel

...

8.2.4 SL PRS Transmission Procedure

The following parameters for SL PRS transmission are associated with each SL PRS resource:

[SL PRS resource ID] indicates an identity of a SL PRS resource. The SL PRS resource is identified by the SL PRS resource ID that is unique within a slot of a dedicated SL PRS resource pool. For a shared resource pool, a SL PRS resource is uniquely identified by a combination of the SL PRS resource ID and a SL PRS frequency domain allocation within a slot.

[SL PRS comb offset and comb size] indicates a comb offset and a comb size of the SL PRS resource

[Starting symbol and the number of SL PRS symbols] indicates the starting symbol index within a slot and the number of symbols of the SL PRS resource.

[SL PRS frequency domain allocation] indicates the frequency location [and the number of resource blocks for SL PRS transmission in a shared resource pool.]

Each SL PRS transmission is associated with an PSCCH transmission in the same slot.

In the case of dedicated pool for SL positioning, that PSCCH carries the SCI format 1-B associated with the SL PRS transmission.

The UE may report the association information of the already transmitted SL PRS resources with UE Tx ARP ID.

8.2.4.1 Resource Allocation

In sidelink resource allocation mode 1:

For SL PRS transmission, a UE may be configured with dynamic grant, configured grant type 1, or configured grant type 2

8.2.4.1.1 Resource Allocation in Time Domain

The UE shall transmit the SL PRS in the same slot as the associated PSCCH.

The UE shall transmit the SL PRS in consecutive symbols within the slot.

A UE does not transmit multiple SL PRS resources in the same slot.

For a shared resource pool, the UE transmits the SL PRS in PSSCH symbols according to clause 8.1.2.1, [with the following restrictions:

the number of contiguous symbols for SL PRS transmission, 'M', shall correspond to one of the SL PRS resources in parameter.

the UE shall not transmit SL PRS in symbols where associated PSCCH is transmitted.

the UE shall not transmit SL PRS and PSSCH DMRS in the same symbol.

the UE shall not transmit SL PRS on contiguous symbols either in between or after symbols where PSSCH DMRS is transmitted.

the UE shall transmit SL PRS only after the last symbol with second stage SCI.

For a given value of 'M', SL PRS resource is mapped to the last consecutive 'M' SL symbols in the slot that meet all the other restrictions The UE shall not transmit PSSCH and SL PRS in the same symbol.]

A SL-PRS resource and PSFCH (including the preceding gap symbol) are not mapped on the same symbols For a dedicated resource pool, the UE transmits SL PRS subject to the following restrictions:

the UE shall not transmit SL PRS and associated PSCCH in the same symbol;

the number of contiguous symbols and the starting symbol for SL PRS transmission shall correspond to one of the SL PRS resources in parameter [ ].

In sidelink resource allocation mode 1 for a shared resource pool, the time domain behaviour for sidelink dynamic grants and sidelink configured grants for SL PRS follows the behaviour in clause 8.1.2.1.

In sidelink resource allocation mode 1 for a dedicated resource pool, the time domain behaviour for sidelink dynamic grants and sidelink configured grants for SL PRS follows the behaviour in clause 8.1.2.1, with the following modifications:

["DCI format 3_0" is replaced by "DCI format 32"].

"PSSCH" is replaced by "SL PRS".

8.2.4.1.2 Resource Allocation in Frequency Domain

For a shared resource pool, the frequency domain resource assignment of a SL PRS resource is the same as PSSCH in the same slot.

For a dedicated resource pool, the frequency domain resource assignment of a SL PRS resource is same as frequency resources of a resource pool.

8.2.4.2 UE Procedure for Determining the Subset of Resources to be Reported to Higher Layers in SL PRS Resource Selection in a Dedicated Resource Pool in Sidelink Resource Allocation Mode 2

In resource allocation mode 2 in a dedicated resource pool, the higher layer can request the UE to determine a subset of resources from which the higher layer will select resources for SL PRS[/PSCCH]transmission. To trigger this procedure, in slot n, the higher layer provides the following parameters for this SL PRS[/PSCCH]transmission:

the resource pool from which the resources are to be reported;

L1 priority, $prio_{TX}$;

the remaining [delay budget];

Set of SL-PRS resource ID(s);

optionally, the resource reservation interval, $P_{rsvp\_Tx}$, in units of msec.

if the higher layer requests the UE to determine a subset of resources from which the higher layer will select resources for SL PRS[/PSCCH]transmission as part of re-evaluation or pre-emption procedure, the higher layer provides a set of resources ($r_0, r_1, r_2, \ldots$) which may be subject to re-evaluation and a set of resources ($r_0', r_1', r_2', \ldots$) which may be subject to pre-emption.

it is up to UE implementation to determine the subset of resources as requested by higher layers before or after the slot $r_i''-T_3$, where $r_i''$ is the slot with the smallest slot index among ($r_0, r_1, r_2, \ldots$) and ($r_0', r_1', r_2', \ldots$), and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

The following higher layer parameters affect this procedure:

[sl-SelectionWindowList: internal parameter $T_{2min}$ is set to the corresponding value from higher layer parameter sl-SelectionWindowList for the given value of $prio_{TX}$.]

[sl-Thres-RSRP-List]: this higher layer parameter provides an RSRP threshold for each combination ($p_i$, $p_j$), where $p_i$ is the value of the priority field in a received SCI format 1-B and $p_j$ is the priority of the transmission of the UE selecting resources; for a given invocation of this procedure, $p_j = prio_{TX}$.

[reservationPeriodAllowed-Dedicated-SL-PRS-RP]

[sl-Sensing Window]: internal parameter $T_0$ is defined as the number of slots corresponding to sl-SensingWindow msec

[sl-TxPercentageLis]: internal parameter X for a given $prio_{TX}$ is defined as sl-TxPercentageList ($prio_{TX}$) converted from percentage to ratio

[sl-PreemptionEnable]: if sl-PreemptionEnable is provided, and if it is not equal to 'enabled', internal parameter $prio_pre$ is set to the higher layer provided parameter sl-PreemptionEnable.

The UE shall perform this procedure according to clause 8.1.4, with the following modifications:

Partial sensing is not applicable in a dedicated SL PRS resource pool;

A candidate single-slot resource for transmission $R_{x,y}$ is defined as the SL PRS resource with index x within the Set of SL-PRS resource ID(s) provided by the higher layer and in slot $t'^{SL}$ "SCI format 1-A" is replaced by "SCI format 1-B", In step 5 [ ]

In condition b of step 6, the RSRP measurement is the PSCCH-RSRP over the DM-RS resource elements of the PSSCH;

In condition c of step 6 "determines according to clause 8.1.5 the set of resource blocks and slots" is replaced by "determines according to clause 8.2.4.X the set of slots and SL PRS resources".

8.2.4.2 UE Procedure for Determining Slots and SL PRS Resource(s) Associated with an SCI Format 1-B in a Dedicated Resource Pool The set of slots and SL PRS resources for SL PRS transmission is determined by the PSCCH containing the associated SCI format 1-B, and fields '[SL-PRS resource ID (s))', '[Time resource assignment]' of the associated SCI format 1-B as described below.

The set of slots is determined as in clause 8.1.5, with the following modifications:

"SCI format 1-A" is replaced by "SCI format 1-B",

[potential parameter name changes].

The first SL PRS resource is determined according to the sub-channel used for the PSCCH transmission containing the associated SCI format 1-B: The index of the sub-channel in the resource pool is identical to the index of the SL PRS resource provided by [higher layer parameter].

If [sl-MaxNumPerReserve] is 2 then the index of the second SL PRS resource is indicated by the field [Resource ID indication].

[If [sl-MaxNumPerReserve] is 3 then the index of the second/third SL PRS resource is indicated by the field [Resource ID indication].]

If TRIV determined according to clause 8.1.5 indicates N<sl-MaxNumPerReserve, the SL PRS resource indices corresponding to sl-MaxNumPerReserve minus N last resources are not used.

The number of slots in one set of the time and frequency resources for transmission opportunities of SL PRS is given by $C_{resel}$ where $C_{resel}=10*SL\_RESOURCE\_RESELECTION\_COUNTER$ [10, TS 38.321] if configured else $C_{resel}$ is set to 1.

If a SL PRS resource in slot $t'^{SL}_m$ is determined as the time and frequency resource for SL PRS transmission corresponding to the selected sidelink grant (described in [10, TS 38.321]), the same SL PRS resource in slots $t'_{m+j \times P'_{rsvp\_TX}}$ is also determined for SL PRS transmissions corresponding to the same sidelink grant where j=1, 2, ..., $C_{resel}-1$, $P_{rsvp\_TX}$, if provided, is converted from units of msec to units of logical slots, resulting in $P_{rsvp\_TX}'$, according to clause 8.1.7, and $(t'^{SL}_0, t'^{SL}_1, t'^{SL}_2, ...)$ is determined by Clause 8. Here, $P_{rsvp\_TX}$ is the resource reservation interval indicated by higher layers.

. . .

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A, 2-B and 2-C, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A, 2-B and 2-C, and associated PSSCH resource configuration configured by higher layers. The UE is not required to decode more than one PSCCH at each PSCCH resource candidate.

A UE is required to decode neither the corresponding SCI formats 2-A, 2-B and 2-C nor the PSSCH associated with an SCI format 1-A if the SCI format 1-A indicates an MCS table that the UE does not support.

8.4 UE Procedure for Receiving Reference Signals

. . .

8.4.4 SL PRS Reception Procedure

The UE may be configured, via [higher layer parameter(s)], to measure and report one or more of the SL RSTD, SL Rx-Tx time difference, SL RTOA, SL AoA, SL PRS-RSRP, and SL PRS-RSRPP measurements, for the first detected path and/or additional detected paths. The UE may report an ARP ID associated with the reported measurements. The UE may provide the ARP location information of the ARP ID via [higher layer parameter(s)].

The UE uses the same ARP for both the transmission and reception of sidelink positioning reference signals while performing an SL Rx-Tx time difference measurement.

The UE may include SL PRS resource ID(s) when it reports one or more of the SL RSTD, SL Rx-Tx time difference, SL RTOA, SL AoA, SL PRS-RSRP, and SL PRS-RSRPP measurements.

For the SL RSTD, SL Rx-Tx time difference, SL RTOA, SL AoA, SL PRS-RSRP, and SL PRS-RSRPP measurements, the UE reports an associated SL PRS reception timestamp via higher layer parameter [sl-prs-time-stamp]. For SL Rx-Tx time difference, the UE may report an associated SL PRS transmission timestamp via higher layer parameter [sl-prs-time-stamp]. The timestamp includes SFN, slot number, and optionally nr-PhysCellID, nr-ARFCN, nr-CellGlobalID, or the timestamp includes DFN and slot number.

The UE may report, LoS/NLoS indicator(s) via [nr-los-nlos-Indicator]associated with each SL RSTD, SL Rx-Tx time difference, SL RTOA, SL AoA, SL PRS-RSRP, and SL PRS-RSRPP measurements.

The UE may report synchronization information synchronization source type and/or relative time difference with the associated quality metric, via [higher layer parameter(s)]. For the SL RSTD measurement, the UE may report a reference UE information.

For SL RTOA measurement, SFN or DFN initialization time may be provided to the UE by a UE or the network.

The UE may be provided with the location information of other UEs via [higher layer parameter]. The UE may report the location information of the UE to the network.

The UE may be provided with expected SL AoA and uncertainty range of the expected SL AoA via [higher layer parameter].

The UE may report quality metric [time quality] corresponding to the SL RSTD, SL RTOA or SL Rx-Tx time difference measurements. The UE may report quality metric [angle quality] corresponding to the SL AoA measurement. [If the '[SL PRS request]' field in the SCI associated with the received SL PRS is set to 1 then the UE shall report this request for SL PRS transmission to higher layers.]

\*\*\*\*\*\*\*\*\*\*\*\*\*\*\*\*\*\*\*\*\*\*\*\*\*\*\*\*\*\* QUOTATION [2] END \*\*\*\*\*\*\*\*\*\*\*\*\*\*\*\*\*\*\*\*\*\*\*\*\*\*\*\*\*\*\*\*

In TS 38.214 ([3]3GPP TS 38.214 V17.6.0 (2023-09) 3GPP; TSG RAN; NR; Physical layer procedures for data (Release 17)), SL related procedure in MAC layer is specified.

\*\*\*\*\*\*\*\*\*\*\*\*\*\*\*\*\*\*\*\*\*\*\*\*\*\*\*\*\*\* QUOTATION [3] START \*\*\*\*\*\*\*\*\*\*\*\*\*\*\*\*\*\*\*\*\*\*\*\*\*\*\*\*\*\*\*\*

5.22 SL-SCH Data Transfer
5.22.1 SL-SCH Data Transmission
5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SL-CS-RNTI with NDI=1 is considered as a dynamic sidelink grant.

. . .

If the MAC entity has been configured with Sidelink resource allocation mode 2 to transmit using pool(s) of resources in a carrier as indicated in TS 38.331 [5] or TS 36.331 [21] based on full sensing, or partial sensing, or random selection or any combination(s), the MAC entity shall for each Sidelink process:

NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection, or partial sensing, or full sensing only after releasing configured sidelink grant(s), if any.

. . . 1> if the MAC entity has selected to create a selected sidelink grant corresponding to transmissions of multiple MAC PDUs, and SL data is available in a logical channel:

2> if the MAC entity has not selected a pool of resources allowed for the logical channel:

. . .

2> perform the TX resource (re-)selection check on the selected pool of resources as specified in clause 5.22.1.2;

NOTE 3: The MAC entity continuously performs the TX resource (re-)selection check until the corresponding pool of resources is released by RRC or the MAC entity decides to cancel creating a selected sidelink grant corresponding to transmissions of multiple MAC PDUs.

. . .

NOTE 3A: The MAC entity selects a value for the resource reservation interval which is larger than the remaining PDB of SL data available in the logical channel.

3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_ COUNTER to the selected value;

3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-default-TxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-Tx-PoolExceptional is not used;

3> select an amount of frequency resources within the range, if configured by RRC, between sl-MinSubChannelNumPSSCH and sl-MaxSubchannelNumPSSCH included in sl-PSSCH-TxConfigList and, if configured by RRC, overlapped between sl-MinSubChannelNumPSSCH and sl-MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-Tx-PoolExceptional is not used;

3> if sl-InterUE-CoordinationScheme1 enabling reception/transmission of preferred resource set and non-preferred resource set is not configured by RRC:

4> if transmission based on random selection is configured by upper layers:

5> randomly select the time and frequency resources for one transmission opportunity from the resource pool which occur within the SL DRX Active time, if configured, as specified in clause 5.28.2 of the destination UE selected for indicating to the physical layer the SL DRX Active time above, according to the amount of selected frequency resources and the remaining PDB of SL data available in the logical channel(s) allowed on the carrier.

4> else:

5> randomly select the time and frequency resources for one transmission opportunity from the resources indicated by the physical layer as specified in clause 8.1.4 of TS 38.214 [7] which occur within the SL DRX Active time, if configured, as specified in clause 5.28.2 of the destination UE selected for indicating to the physical layer the SL DRX Active time above, according to the amount of selected frequency resources and the remaining PDB of SL data available in the logical channel(s) allowed on the carrier.

. . .

3> use the randomly selected resource to select a set of periodic resources spaced by the resource reservation interval for transmissions of PSCCH and PSSCH corresponding to the number of transmission opportunities of MAC PDUs determined in TS 38.214 [7].
3> if one or more HARQ retransmissions are selected:
   4> if sl-InterUE-CoordinationScheme1 enabling reception/transmission of preferred resource set and non-preferred resource set is not configured by RRC:
      5> if transmission based on full sensing or partial sensing is configured by upper layers and there are available resources left in the resources indicated by the physical layer according to clause 8.1.4 of TS 38.214 [7] for more transmission opportunities; or
      5> if transmission based on random selection is configured by upper layers and there are available resources left in the resource pool for more transmission opportunities:
         6> randomly select the time and frequency resources for one or more transmission opportunities from the available resources which occur within the SL DRX Active time, if configured, as specified in clause 5.28.2 of the destination UE selected for indicating to the physical layer the SL DRX Active time above, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].

. . .

4> use the randomly selected resource to select a set of periodic resources spaced by the resource reservation interval for transmissions of PSCCH and PSSCH corresponding to the number of retransmission opportunities of the MAC PDUs determined in TS 38.214 [7];
   4> consider the first set of transmission opportunities as the initial transmission opportunities and the other set(s) of transmission opportunities as the retransmission opportunities;
   4> consider the sets of initial transmission opportunities and retransmission opportunities as the selected sidelink grant.
3> else:
   4> consider the set as the selected sidelink grant.
3> use the selected sidelink grant to determine the set of PSCCH durations and the set of PSSCH durations according to TS 38.214 [7].
2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:
   3> clear the selected sidelink grant, if available;
   3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
   3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].
1> if the MAC entity has selected to create a selected sidelink grant corresponding to transmission(s) of a single MAC PDU, and if SL data is available in a logical channel, or an SL-CSI reporting is triggered, or a Sidelink DRX Command indication is triggered or a Sidelink Inter-UE Coordination Information reporting is triggered, or a Sidelink Inter-UE Coordination Request is triggered:
   2> if SL data is available in the logical channel for NR sidelink discovery:

. . .

2> else if SL data for NR sidelink communication is available in the logical channel:
      3> if sl-HARQ-FeedbackEnabled is set to enabled for the logical channel:
         4> select any pool of resources configured with PSFCH resources among the pools of resources except the pool(s) in sl-BWP-DiscPoolConfig or sl-BWP-DiscPoolConfigCommon, if configured.
      3> else:
         4> select any pool of resources among the pools of resources except the pool(s) in sl-BWP-DiscPoolConfig or sl-BWP-DiscPoolConfigCommon, if configured.
   2> else if an SL-CSI reporting or a Sidelink DRX Command or a Sidelink Inter-UE Coordination Request or a Sidelink Inter-UE Coordination Information is triggered:
      3> select any pool of resources among the pools of resources except the pool(s) in sl-BWP-DiscPoolConfig or sl-BWP-DiscPoolConfigCommon, if configured.
   2> perform the TX resource (re-)selection check on the selected pool of resources as specified in clause 5.22.1.2;
   2> if the TX resource (re-)selection is triggered as the result of the TX resource (re-)selection check:
      3> if one or multiple SL DRX(s) is configured in the destination UE(s) receiving SL-SCH data:
         4> indicate to the physical layer SL DRX Active time in the destination UE(s) receiving SL-SCH data, as specified in clause 5.28.2.

3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available or the corresponding sl-DefaultCBR-PartialSensing configured by RRC if partial sensing is selected and CBR measurement results are not available, or the corresponding sl-Default-CBR-RandomSelection configured by RRC if random selection is selected and CBR measurement results are not available in case the sl-TxPoolExceptional is not used;

3> select an amount of frequency resources within the range, if configured by RRC, between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-TxPoolExceptional is not used;

3> if sl-InterUE-CoordinationScheme1 enabling reception/transmission of preferred resource set and non-preferred resource set is not configured by RRC:
  4> if transmission based on random selection is configured by upper layers:
    5> randomly select the time and frequency resources for one transmission opportunity from the resources pool which occur within the SL DRX Active time, if configured, as specified in clause 5.28.2 of the destination UE selected for indicating to the physical layer the SL DRX Active time above, according to the amount of selected frequency resources and the remaining PDB of SL data available in the logical channel(s) allowed on the carrier, and the latency requirement of the triggered SL CSI reporting.
  4> else:
    5> randomly select the time and frequency resources for one transmission opportunity from the resources indicated by the physical layer as specified in clause 8.1.4 of TS 38.214 [7] which occur within the SL DRX Active time, if configured, as specified in clause 5.28.2 of the destination UE selected for indicating to the physical layer the SL DRX Active time above, according to the amount of selected frequency resources and the remaining PDB of SL data available in the logical channel(s) allowed on the carrier, and/or the latency requirement of the triggered SL-CSI reporting.

. . .

3> if one or more HARQ retransmissions are selected:
  4> if sl-InterUE-CoordinationScheme1 enabling reception/transmission of preferred resource set and non-preferred resource set is not configured by RRC:
    5> if transmission based on full sensing or partial sensing is configured by upper layers and there are available resources left in the resources indicated by the physical layer according to clause 8.1.4 of TS 38.214 [7] for more transmission opportunities; or
    5> if transmission based on random selection is configured by upper layers and there are available resources left in the resources pool for more transmission opportunities:
      6> randomly select the time and frequency resources for one or more transmission opportunities from the available resources which occur within the SL DRX Active time, if configured, as specified in clause 5.28.2 of the destination UE selected for indicating to the physical layer the SL DRX Active time above, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];

. . .

4> consider a transmission opportunity which comes first in time as the initial transmission opportunity and other transmission opportunities as the retransmission opportunities;
  4> consider all the transmission opportunities as the selected sidelink grant.
3> else:
  4> consider the set as the selected sidelink grant.
3> use the selected sidelink grant to determine PSCCH duration(s) and PSSCH duration(s) according to TS 38.214 [7].

. . .

NOTE 3B1: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

. . .

1> if a selected sidelink grant is available for retransmission(s) of a MAC PDU which has been positively acknowledged as specified in clause 5.22.1.3.3:
  2> clear the PSCCH duration(s) and PSSCH duration(s) corresponding to retransmission(s) of the MAC PDU from the selected sidelink grant.

NOTE 3C: How the MAC entity determines the remaining PDB of SL data is left to UE implementation.

For a selected sidelink grant, the minimum time gap between any two selected resources comprises:

a time gap between the end of the last symbol of a PSSCH transmission of the first resource and the start of the first symbol of the corresponding PSFCH reception determined by sl-MinTimeGapPSFCH and sl-PSFCH-Period for the pool of resources; and a time required for PSFCH reception and processing plus sidelink retransmission preparation including multiplexing of necessary physical channels and any TX-RX/RX-TX switching time.

NOTE: How to determine the time required for PSFCH reception and processing plus sidelink retransmission preparation is left to UE implementation.

The MAC entity shall for each PSSCH duration:
1> for each sidelink grant occurring in this PSSCH duration:
  2> select a MCS table allowed in the pool of resource which is associated with the sidelink grant;
NOTE 4a: MCS table selection is up to UE implementation if more than one MCS table is configured.
  2> if the MAC entity has been configured with Sidelink resource allocation mode 1:
    3> select a MCS which is, if configured, within the range that is configured by RRC between sl-MinMCS-PSSCH and sl-MaxMCS-PSSCH associated with the selected MCS table included in sl-ConfigDedicatedNR;
    3> set the resource reservation interval to 0ms.
  2> else:
    3> select a MCS which is, if configured, within the range, if configured by RRC, between sl-MinMCS-PSSCH and sl-MaxMCS-PSSCH associated with the selected MCS table included in sl-PSSCH-TxConfigList and, if configured by RRC, overlapped between sl-MinMCS-PSSCH and sl-MaxMCS-PSSCH associated with the selected MCS table indicated in sl-CBR-PriorityTxConfigList for the highest priority of the sidelink logical channel(s) in the MAC PDU and the CBR measured by lower layers according to clause 5.1.27 of TS 38.215 [24] if CBR measurement results are available or the corresponding sl-defaultTxConfigIndex configured by RRC if CBR measurement results are not available or the corresponding sl-DefaultCBR-PartialSensing configured by RRC if partial sensing is selected and CBR measurement results are not available, or the corresponding sl-DefaultCBR-RandomSelection configured by RRC if random selection is selected and CBR measurement results are not available in case the sl-TxPoolExceptional is not used;
    3> if the MAC entity decides not to use the selected sidelink grant for the next PSSCH duration corresponding to an initial transmission opportunity:
      4> set the resource reservation interval to 0ms.
    3> else:
      4> set the resource reservation interval to the selected value.
NOTE 5: MCS selection is up to UE implementation if the MCS or the corresponding range is not configured by RRC.
  2> if the configured sidelink grant has been activated and this PSSCH duration corresponds to the first PSSCH transmission opportunity within this sl-PeriodCG of the configured sidelink grant:
    3> set the HARQ Process ID to the HARQ Process ID associated with this PSSCH duration and, if available, all subsequent PSSCH duration(s) occurring in this sl-PeriodCG for the configured sidelink grant;
    3> determine that this PSSCH duration is used for initial transmission;
    3> flush the HARQ buffer of Sidelink process associated with the HARQ Process ID.
  2> deliver the sidelink grant, the selected MCS, and the associated HARQ information to the Sidelink HARQ Entity for this PSSCH duration.

. . .

5.22.1.2 TX Resource (Re-)Selection Check

If the TX resource (re-)selection check procedure is triggered on the selected pool of resources for a Sidelink process according to clause 5.22.1.1, the MAC entity shall for the Sidelink process:
1> if PSCCH duration(s) and $2^{nd}$ stage SCI on PSSCH for all transmissions of a MAC PDU of any selected sidelink grant(s) are not in SL DRX Active time as specified in clause 5.28.3 of the destination that has data to be sent; or
1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by RRC in sl-ProbResourceKeep; or
1> if the pool of resources is configured or reconfigured by RRC; or
1> if there is no selected sidelink grant on the selected pool of resources; or
1> if neither transmission nor retransmission has been performed by the MAC entity on any resource indicated in the selected sidelink grant during the last second; or
1> if sl-ReselectAfter is configured and the number of consecutive unused transmission opportunities on resources indicated in the selected sidelink grant, which is incremented by 1 when none of the resources of the selected sidelink grant within a resource reservation interval is used, is equal to sl-ReselectAfter; or
1> if the selected sidelink grant cannot accommodate a RLC SDU by using the maximum allowed MCS configured by RRC in sl-MaxMCS-PSSCH associated with the selected MCS table and the UE selects not to segment the RLC SDU; or
NOTE 1: If the selected sidelink grant cannot accommodate the RLC SDU, it is left for UE implementation whether to perform segmentation or sidelink resource reselection.
1> if transmission(s) with the selected sidelink grant cannot fulfil the remaining PDB of the data in a logical channel, and the MAC entity selects not to perform transmission(s) corresponding to a single MAC PDU:

NOTE 2: If the remaining PDB is not met, it is left for UE implementation whether to perform transmission(s) corresponding to single MAC PDU or sidelink resource reselection.

NOTE 3: It is left for UE implementation whether to trigger the TX resource (re-)selection due to the latency requirement of the MAC CE triggered according to clause 5.22.1.7.
   2> clear the selected sidelink grant associated to the Sidelink process, if available;
   2> trigger the TX resource (re-)selection.

NOTE 4: Void.
NOTE 5: Void.
. . .
. . .

5.22.1.4 Multiplexing and Assembly
5.22.1.4.0 General

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

NOTE: Sidelink data for discovery and sidelink data for non-discovery transmitted by a UE cannot be multiplexed into the same TB because they are always associated with different destination L2 IDs (see TS 23.304 [26]).

5.22.1.4.1 Logical Channel Prioritization
5.22.1.4.1.1 General

The sidelink Logical Channel Prioritization procedure is applied whenever a new transmission is performed.

RRC controls the scheduling of sidelink data by signalling for each logical channel:
   sl-Priority where an increasing priority value indicates a lower priority level;
   sl-PrioritisedBitRate which sets the sidelink Prioritized Bit Rate (sPBR);
   sl-BucketSizeDuration which sets the sidelink Bucket Size Duration (sBSD).

RRC additionally controls the LCP procedure by configuring mapping restrictions for each logical channel:
   sl-configuredGrantType1Allowed which sets whether a configured grant Type 1 can be used for sidelink transmission;
   sl-AllowedCG-List which sets the allowed configured grant(s) for sidelink transmission;
   sl-HARQ-FeedbackEnabled which sets whether the logical channel is allowed to be multiplexed with logical channel(s) with sl-HARQ-FeedbackEnabled set to enabled or disabled.

The following UE variable is used for the Logical channel prioritization procedure:
   SBj which is maintained for each logical channel j.

The MAC entity shall initialize SBj of the logical channel to zero when the logical channel is established.

For each logical channel j, the MAC entity shall:
   1> increment SBj by the product sPBR×T before every instance of the LCP procedure, where T is the time elapsed since SBj was last incremented;
   1> if the value of SBj is greater than the sidelink bucket size (i.e. sPBR×sBSD):
      2> set SBj to the sidelink bucket size.

NOTE: The exact moment(s) when the UE updates SBj between LCP procedures is up to UE implementation, as long as SBj is up to date at the time when a grant is processed by LCP.

5.22.1.4.1.2 Selection of Logical Channels

The MAC entity shall for each SCI corresponding to a new transmission:
   1> if sl-BWP-DiscPoolConfig or sl-BWP-DiscPoolConfigCommon is configured according to TS 38.331 [5]:
      2> if the new transmission is associated to a sidelink grant in sl-DiscTxPoolSelected or sl-DiscTxPoolScheduling configured in sl-BWP-DiscPoolConfig or sl-BWP-DiscPoolConfigCommon:
         3> select a Destination associated with NR sidelink discovery as specified in TS 23.304 [26], that is in the SL Active time for the SL transmission occasion if SL DRX is applied for the destination, and among the logical channels that satisfy all the following conditions for the SL grant associated to the SCI:
            4> SL data for NR sidelink discovery is available for transmission; and
            4> SBj>0, in case there is any logical channel having SBj>0; and
            4> sl-configuredGrantType1Allowed, if configured, is set to true in case the SL grant is a Configured Grant Type 1; and
            4> sl-AllowedCG-List, if configured, includes the configured grant index associated to the SL grant.
      2> else:
         3> select a Destination associated to one of unicast, groupcast and broadcast (excluding the Destination(s) associated with NR sidelink discovery as specified in TS 23.304 [26]), that is in the SL Active time for the SL transmission occasion if SL DRX is applied for the destination, and having at least one of the MAC CE and the logical channel with the highest priority, among the logical channels that satisfy all the following conditions and MAC CE(s), if any, for the SL grant associated to the SCI:
            4> SL data for NR sidelink communication is available for transmission; and
            4> SBj>0, in case there is any logical channel having SBj>0; and
            4> sl-configuredGrantType1Allowed, if configured, is set to true in case the SL grant is a Configured Grant Type 1; and
            4> sl-AllowedCG-List, if configured, includes the configured grant index associated to the SL grant; and
            4> sl-HARQ-FeedbackEnabled is set to disabled, if PSFCH is not configured for the SL grant associated to the SCI.
   1> else:
      2> select a Destination associated to one of unicast, groupcast and broadcast, that is in the SL Active time for the SL transmission occasion if SL DRX is applied for the destination, and having at least one of the MAC CE and the logical channel with the highest priority, among the logical channels that satisfy all the following conditions and MAC CE(s), if any, for the SL grant associated to the SCI:
         3> SL data is available for transmission; and
         3> SBj>0, in case there is any logical channel having SBj>0; and
         3> sl-configuredGrantType1Allowed, if configured, is set to true in case the SL grant is a Configured Grant Type 1; and 3> sl-AllowedCG-List, if configured, includes the configured grant index associated to the SL grant; and
3> sl-HARQ-FeedbackEnabled is set to disabled, if PSFCH is not configured for the SL grant associated to the SCI.

NOTE 1: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.

1> select the logical channels satisfying all the following conditions among the logical channels belonging to the selected Destination:
2> SL data is available for transmission; and
2> sl-configuredGrantType1Allowed, if configured, is set to true in case the SL grant is a Configured Grant Type 1; and.
2> sl-AllowedCG-List, if configured, includes the configured grant index associated to the SL grant; and
2> sl-HARQ-FeedbackEnabled is set to the value that satisfies the following conditions:
3> if PSFCH is configured for the sidelink grant associated to the SCI and the UE is capable of PSFCH reception:
4> sl-HARQ-FeedbackEnabled is set to enabled, if sl-HARQ-FeedbackEnabled is set to enabled for the highest priority logical channel satisfying the above conditions; or
4> sl-HARQ-FeedbackEnabled is set to disabled, if sl-HARQ-FeedbackEnabled is set to disabled for the highest priority logical channel satisfying the above conditions.
3> else:
4> sl-HARQ-FeedbackEnabled is set to disabled.

NOTE 2: HARQ feedback enabled/disabled indicator is set to disabled for the transmission of a MAC PDU only carrying CSI reporting MAC CE or Sidelink DRX Command MAC CE or Sidelink Inter-UE Coordination Request MAC CE or Sidelink Inter-UE Coordination Information MAC CE.

5.22.1.4.1.3 Allocation of Sidelink Resources

The MAC entity shall for each SCI corresponding to a new transmission:
1> allocate resources to the logical channels as follows:
2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);
2> decrement SBj by the total size of MAC SDUs served to logical channel j above;
2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.

NOTE 1: The value of SBj can be negative.

The UE shall also follow the rules below during the SL scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data;
if the MAC entity is given a sidelink grant size that is equal to or larger than 12 bytes while having data available and allowed (according to clause 5.22.1.4.1) for transmission, the MAC entity shall not transmit only padding;
A logical channel configured with sl-HARQ-FeedbackEnabled set to enabled and a logical channel configured with sl-HARQ-FeedbackEnabled set to disabled cannot be multiplexed into the same MAC PDU.

The MAC entity shall not generate a MAC PDU for the HARQ entity if the following conditions are satisfied:
there is no Sidelink CSI Reporting MAC CE generated for this PSSCH transmission as specified in clause 5.22.1.7; and
there is no Sidelink DRX Command MAC CE generated for this PSSCH transmission as specified in clause 5.22.1.8; and
there is no Sidelink Inter-UE Coordination Request MAC CE generated for this PSSCH transmission as specified in clause 5.22.1.9; and
there is no Sidelink Inter-UE Coordination Information MAC CE generated for this PSSCH transmission as specified in clause 5.22.1.10; and
the MAC PDU includes zero MAC SDUs.

Logical channels shall be prioritised in accordance with the following order (highest priority listed first):
data from SCCH;
Sidelink CSI Reporting MAC CE;
Sidelink Inter-UE Coordination Request MAC CE and Sidelink Inter-UE Coordination Information MAC CE;
Sidelink DRX Command MAC CE;
data from any STCH.

NOTE 2: The priority order between Sidelink Inter-UE Coordination Request MAC CE and Sidelink Inter-UE Coordination Information MAC CE is up to UE implementation.

5.22.1.4.2 Multiplexing of MAC Control Elements and MAC SDUs

The MAC entity shall multiplex MAC CEs and MAC SDUs in a MAC PDU according to clauses 5.22.1.4.1 and 6.1.6.

. . .

5.22.1.7 CSI Reporting

The Sidelink Channel State Information (SL-CSI) reporting procedure is used to provide a peer UE with sidelink channel state information as specified in clause 8.5 of TS 38.214 [7].

RRC configures the following parameters to control the SL-CSI reporting procedure:
sl-LatencyBoundCSI-Report, which is maintained for each PC5-RRC connection.

The MAC entity maintains an sl-CSI-ReportTimer for each pair of the Source Layer-2 ID and the Destination Layer-2 ID corresponding to a PC5-RRC connection. sl-CSI-ReportTimer is used for an SL-CSI reporting UE to follow the latency requirement signalled from a CSI triggering UE. The value of sl-CSI-ReportTimer is the same as the latency requirement of the SL-CSI reporting in sl-LatencyBoundCSI-Report configured by RRC.

The MAC entity shall for each pair of the Source Layer-2 ID and the Destination Layer-2 ID corresponding to a PC5-RRC connection which has been established by upper layers:

1> if the SL-CSI reporting has been triggered by an SCI and not cancelled:
   2> if the sl-CSI-ReportTimer for the triggered SL-CSI reporting is not running:
      3> start the sl-CSI-ReportTimer.
   2> if the sl-CSI-ReportTimer for the triggered SL-CSI reporting expires:
      3> cancel the triggered SL-CSI reporting.
   2> else if the MAC entity has SL resources allocated for new transmission and the SL-SCH resources can accommodate the SL-CSI reporting MAC CE and its subheader as a result of logical channel prioritization:
      3> instruct the Multiplexing and Assembly procedure to generate a Sidelink CSI Reporting MAC CE as defined in clause 6.1.3.35;
      3> stop the sl-CSI-ReportTimer for the triggered SL-CSI reporting;
      3> cancel the triggered SL-CSI reporting.
   2> else if the MAC entity has been configured with Sidelink resource allocation mode 1:
      3> trigger a Scheduling Request.

**************************** QUOTATION [3] END ****************************

In [4] RP-231460, "New WID on Expanded and Improved NR Positioning", Intel), WID on expanded and improved NR positioning is introduced.

**************************** QUOTATION [4] START ****************************

3 Justification

In Release 17, 3GPP RAN conducted studies on "NR Positioning Enhancements" and "Scenarios and requirements of in-coverage, partial coverage, and out-of-coverage NR positioning use cases".

The study on "Scenarios and requirements of in-coverage, partial coverage, and out-of-coverage NR positioning use cases" focused on V2X and public safety use cases with the outcome being captured in TR38.845. Additionally, SA1 has developed requirements in TS22.261 for "Ranging based services" and has developed positioning accuracy requirements in TS22.104 for IIoT use cases in out-of-coverage scenarios.

. . .

Towards determination of the scenarios and requirements, bandwidth requirements, and solutions for support of sidelink ranging/positioning, enabling improved integrity, accuracy, and power efficiency for NR positioning solutions, and evaluation of positioning performance for RedCap UEs, a Rel-18 Study Item on "Study on Expanded and Improved NR Positioning" has been carried out by 3GPP. The outcome of the study are documented in 3GPP TR 38.859.

Based on the study, various features and enhancements have been recommended for normative work for support of sidelink ranging/positioning, support of integrity for RAT-dependent positioning methods, enhancements to enable LPHAP use-cases defined in TS 22.104, and support of positioning for RedCap UEs with acceptable positioning accuracy considering requirements for IIoT, commercial, Public Safety and V2X use-cases.

. . .

4 Objective 4.1 Objective of Core Part WI

The objective of this work item is to specify solutions to introduce sidelink ranging/positioning, to introduce integrity for RAT-dependent positioning methods, to enable LPHAP use-case 6 defined in TS 22.104, to improve positioning accuracy, and to introduce support of positioning for RedCap UEs.

The specific objectives of this work item are:

1 Specify solutions for support of sidelink positioning (including ranging) in NR systems, including the following [RAN1, RAN2, RAN3, RAN4]:
   a. Specify SL PRS for support of sidelink positioning such that the SL PRS uses a comb-based (full RE mapping pattern is not precluded) frequency domain structure and a pseudorandom-based sequence where the existing sequence of DL-PRS is used as a starting point [RAN1].
      i. Specify support for SL PRS bandwidths of up to 100 MHz in FR1 spectrum.
      ii. NOTE: SL PRS transmission in FR2 is not precluded but no FR2 specific aspects will be specified.
   b. Specify measurements to support RTT-type solutions using SL, SL-AoA, and SL-TDOA [RAN1, RAN2].
   c. Specify support of resource allocation for SL PRS:
      i. Including resource allocation Scheme 1 and Scheme 2, where Scheme 1 corresponds to a network-centric SL PRS resource allocation and Scheme 2 corresponds to UE autonomous SL PRS resource allocation [RAN1].
         1. For resource allocation mechanism for SL PRS in Scheme 2:
            a. Study and specify support of sensing-based resource allocation, and/or a random resource selection [RAN1].
            b. Study and specify solutions for congestion control for SL PRS and/or inter-UE coordination for SL-PRS [RAN1].
      ii. Support resource allocation for shared resource pool with Rel-16/17/18 sidelink communication and dedicated resource pool for SL PRS [RAN1].
         1. NOTE: For SL positioning resource (pre-)configuration in a shared resource pool with Rel-16/17/18 sidelink communication, backward compatibility with legacy Rel-16/17 UEs should be ensured.
   d. Specify procedures for transmit power control for SL PRS transmissions at least based on open loop power control (OLPC) [RAN1].
   e. Specify signalling and associated UE behavior for support of unicast, groupcast (not including many to one) and broadcast of SL PRS transmissions [RAN1, RAN2].
   f. Specify reporting signalling and procedures to facilitate support of SL positioning in all coverage scenarios and for PC5-only and joint PC5-Uu scenarios [RAN2, RAN3]:
      i. Specify the protocol and procedures for SL positioning between UEs (Protocol for Sidelink positioning procedures (SLPP)).
      ii. Specify the protocol and procedures for SL positioning between UEs and LMF.

**************************** QUOTATION [4] END ****************************

In RAN1 #112bis ([5] RAN1 Chair's Notes of 3GPP TSG RAN WG1 #112bis), there are some agreements on sidelink positioning.

****************************** QUOTATION [5]
START ***********************************
Agreement
  For the scheme 2 sensing-based resource allocation:
    Alt. 2: Rel-16 resource (re)-selection procedure with periodic and without periodic reservations is the starting point for the design of SL-PRS in the dedicated resource pool.
      Note: This means that Rel-17 partial sensing is not considered a starting point for the design
Agreement
  For Scheme 2, in a dedicated resource pool, using Rel-16 resource (re)-selection procedure as the starting point, consider at least the following potential modifications:
    Modification 1: For the RS used to derive L1 SL-RSRP for resource exclusion:
      Option 1: SL-PRS
      Option 2: PSCCH DMRS
      Option 3: PSSCH DMRS (if PSSCH is included in the dedicated resource pool)
    Modification 2: For the resource selection window:
      Option 1: for the derivation of the window, using the legacy approach as a starting point, substitute the Packet Delay Budget (PDB) with a new delay budget
      Option 2: the selection window is provided by higher layers
    Modification 3: For the SL-PRS priority:
      Option 1: A single L1 SL-PRS priority is allowed in a resource pool
      Option 2: Multiple L1 SL-PRS priority are allowed in a resource pool
    Modification 4: For the definition of a candidate resource within the resource selection window:
      Options TBD
    Modification 5: For the reservation interval of SL-PRS:
      Option 1: Provided by UE's higher layers with values TBD. The set of values is (pre-)configured.
    Modification 6: For the sensing window length ($T_0$):
      Option 1: Use the legacy (pre-)configuration with values (100 msec, 1100 msec)
      Option 2: Equal to or larger than the largest reservation interval
      Option 3: Provided by higher layers with values TBD
    Modification 7: For the initial S-RSRP threshold & step-size, target resource ratio X (%):
      Options TBD
    Modification 8: For the pre-emption of the reserved resources:
      Options TBD
    Note 1: Other potential modifications and/or other options within each modification are not precluded
    Note 2: Multiple options for each potential modification may be supported
Agreement
  In Scheme 2, with regards to the triggering of SL-PRS,
    Support SL-PRS transmission triggering at the physical layer by the UE's own higher layers
    Working assumption: Support UE-A to request UE-B to transmit SL-PRS via lower layer signaling sent by UE-A.
      Up to UE-B's own higher layers to transmit SL-PRS in response to the lower layer request from UE-A
      FFS: Lower layer signaling corresponds to SCI, MAC-CE, or SL-PRS
****************************** QUOTATION [5]
END ***********************************

In RAN1 #113 ([6] RAN1 Chair's Notes of 3GPP TSG RAN WG1 #113), there are some agreements on sidelink positioning.
****************************** QUOTATION [6]
START ***********************************
Agreement
  In a dedicated resource pool, a SL PRS resource is immediately preceded by an AGC symbol unless RAN1 explicitly agrees that an AGC symbol is not included for specific cases (if any).
Agreement
  For a dedicated resource pool, at least the case where SL PRS bandwidth is same as resource pool bandwidth is supported.
Agreement
  For a shared resource pool, SL PRS bandwidth is same as the bandwidth indicated for PSSCH.
Agreement
  For a shared resource pool
    A SL PRS resource refers to a time-frequency resource within a slot that is used for SL PRS transmission.
    Characteristics associated with a SL PRS resource in a slot of a shared resource pool include at least:
    SL PRS resource ID,
    SL PRS comb offset and associated SL PRS comb size (N),
    SL PRS starting symbol and number of SL PRS symbols (M),
    SL PRS frequency domain allocation
      SL PRS freq domain allocation is not used to identify a unique SL PRS resource ID
    A SL PRS resource is identified by a combination of SL PRS resource ID and a SL PRS frequency domain allocation. This combination is unique within a slot of a shared resource pool.
    NOTE 1: The above does not imply need for signalling/(pre-)configuration of all these parameters
Conclusion
  For a dedicated or shared resource pool, at least the following characteristics are NOT included as part of characteristics of a SL PRS resource:
    Periodicity, number of instances/repetitions of SL PRS
Conclusion
  TDM-ed SL PRS resources within a slot from a single UE in a dedicated/shared resource pool is not supported in Rel-18.
Agreement
  Multiple (M,N) pairs within a slot in a dedicated resource pool is supported only when the different (M, N) pairs are always multiplexed via TDM to different sets of symbols in a slot. Only a single (M,N) value can be mapped within one TDM duration (i.e. one set of symbols).
Agreement
  For SL PRS in a shared resource pool, the symbols of a SL-PRS resource within a slot are consecutive symbols.
Agreement
  For a dedicated resource pool for SL positioning, SL-PRS cannot be transmitted in a slot without associated PSCCH.
Agreement
  PSSCH is not included in dedicated resource pool for SL positioning.
Agreement
  With regards to the SCI signaling in a shared resource pool,
    Support a new format for 2nd stage SCI.
      FFS how to indicate the new 2nd stage SCI format FFS: If a 2nd stage SCI indicates both SL-PRS and SL-SCH, the cast type, destination ID, source ID are shared.

Agreement

In shared resource pools,

With regards to PSCCH and SL-PRS multiplexing, support Alt. B.1. from previous agreement (i.e., Only TDMing is supported)

Agreement

In a shared resource pool, SL-PRS, associated PSCCH and PSSCH scheduled by the PSCCH are included in the same slot:

With regards to PSCCH and SL-PRS multiplexing, only TDMing is supported for the already agreed comb sizes 1, 2, 4

Agreement

In a shared resource pool, SL-PRS, associated PSCCH and PSSCH scheduled by the PSCCH are included in the same slot:

The PSSCH is used for 2nd SCI and SL-SCH

Note: the UE may not have data available for transmission. Up to RAN2 how to define the specification support for this case.

Agreement

PSFCH is not included in dedicated resource pool for SL positioning.

Agreement

In the dedicated resource pool, with regards to the SL-PRS time-domain resource allocation within the resource pool support a SL-PRS-resource-based allocation SCI for SL-PRS should at least indicate the following values:

Source ID

Destination ID

Resource reservation period

SL-PRS Priority

Cast type

With regards to the SL-PRS configuration and/or SL-PRS time assignment information, select one alternative at RAN1 #114:

Alt. 3.1: support a one-to-one mapping relationship between a PSCCH resource and an associated SL-PRS resource in the same slot.

Note: In this case, there is no need of an explicit signaling of which SL PRS resource for the same slot Note: Same number of PSCCH resource(s) and SL-PRS resource(s)

. . .

Agreement

In Scheme 2, with regards to the triggering of SL-PRS, confirm the related WA for shared and dedicated resource pools.

With regards to the lower-layer signalling, support SCI associated with SL-PRS transmission FFS: whether this is enabled by (pre)configuration FFS: to support also SL-PRS Agreement For Scheme 2, in a dedicated resource pool, Multiple L1 SL-PRS priority are allowed in a resource pool A SL PRS resource within the resource selection window is used as a candidate resource with regards the reservation interval of SL-PRS, it is provided by UE's higher layers with values TBD. The set of values is (pre-)configured.

Use the periodicities available for legacy SL communication and the ones defined for DL-PRS as a starting point.

with regards to the resource (re)-selection procedure support re-evaluation & pre-emption for SL-PRS using the Rel-16 re-evaluation and pre-emption respectively as a starting point.

Agreement

In Scheme 2, congestion control can restrict the range of parameters for SL PRS configuration per resource pool by CBR and priority. Consider further the following parameter(s):

Option 1: SL PRS transmission power

Option 2: Periodicity of SL PRS

Option 3: Number of occupied subchannels of SL-PRS (for shared resource pool)

Option 4: Number of SL PRS resources in a slot

Option 5: comb-size of a SL PRS resource in a slot

Option 7: Number of OFDM symbols of a SL PRS resource in a slot

Option 8: Number of SL PRS (re-)transmissions

FFS: Other options are not precluded

Agreement

In a dedicated resource pool, with regards to the PSCCH, reuse the PSCCH channel structure of SL communications, at least with regards to the following aspects:

The first PSCCH symbol is mapped to the $2^{nd}$ symbol available for SL transmissions in a slot Note: $1^{st}$ symbol available for SL transmissions in a slot is for PSCCH AGC similar to legacy PSCCH DM-RS in the slot is being reused from legacy The number of PSCCH symbol(s) is (pre-)configured to (down-select at RAN1 #114):

Alt. 1: 2 or 3 symbols (same as legacy)

Alt. 3: 1, or 2 or 3 symbols

The number of PRBs is (pre-)configured using the legacy values

FFS: reconsider if 1-symbol PSCCH is supported

**************************** QUOTATION [6] END **********************************

In RAN1 #114 ([7] RAN1 Chair's Notes of 3GPP TSG RAN WG1 #114), there are some agreements on sidelink positioning.

**************************** QUOTATION [7] START **********************************

Agreement

In a shared resource pool:

Opt. B: SL PRS is mapped to contiguous symbols either before, between (as a working assumption), or after PSSCH DMRS symbols Agreement For a dedicated SL PRS resource pool, SL PRS is used as the pathloss reference for OLPC for SL PRS (Option 1 from RAN1 #112bis-e and RAN1 #113 meetings).

Conclusion

For a dedicated resource pool, only the case where SL PRS bandwidth is the same as resource pool bandwidth is supported in Rel-18.

Agreement

For a dedicated resource pool, explicit (pre-)configuration of SL PRS resources in a slot includes:

SL PRS Resource ID, (M, N) pattern, starting symbol, comb offset.

FFS: constraints to the (pre-)configuration to address potential AGC issues

Agreement

For SL PRS in a dedicated or shared resource pool, for a given valid comb size 'N', partially staggered SL PRS patterns (M, N) are supported for all integer values of 'M' such that (M, N)=(1, 2) or (2, 4).

Agreement

For dedicated resource pool, with regards to the SL-PRS configuration and/or SL-PRS time assignment information, support Alt. 3.1, i.e.
  support a one-to-one mapping relationship between a PSCCH resource and an associated SL-PRS resource in the same slot.
    Note: In this case, there is no need of an explicit signaling of which SL PRS resource for the same slot
    Note: Same number of PSCCH resource(s) and SL-PRS resource(s)

Agreement

For PSCCH configuration in a dedicated resource pool, (pre-)configure the number of PRBs of a PSCCH in the resource pool:
  Alt. 1: One parameter for all PSCCHs Agreement For PSCCH configuration in a dedicated resource pool, The number of PSCCH symbol(s) is (pre-)configured to 2 or 3 symbols (same as legacy)

Agreement

In a shared resource pool, when PSSCH and SL-PRS are multiplexed in the same slot, they share the same source ID, destination ID, cast type fields.

Agreement

For Scheme 2, in a dedicated resource pool, with regards to the sensing window length:
  Use the legacy (pre-)configuration with values (100 msec, 1100 msec)
  For Scheme 2, in a dedicated resource pool, for the initial S-RSRP threshold & stepsize, target resource ratio X (%), reuse the legacy values from NR sidelink.

Agreement

For Scheme 2, in a dedicated resource pool, with regards to the resource (re)-selection procedure, the RS used to derive L1 SL-RSRP for resource exclusion is at least PSCCH DMRS.
  FFS: SL-PRS can be (pre)configured to derive L1 SL-RSRP for resource exclusion Agreement In a shared resource pool,
  1. Aspect 4: In addition to the SL-PRS specific parameters, the following information related to PSSCH scheduling to indicate in the new second stage SCI 2-D, support at least the legacy content of SCI format 2-A and 2-B
  1. FFS: to support the legacy content of SCI format 2-C Working Assumption For Scheme 2, in a dedicated resource pool, using Rel-16 resource (re)-selection procedure as the starting point, support the following modification:
  Modification 2: For the resource selection window:
    Option 1: for the derivation of the window, using the legacy approach as a starting point, substitute the Packet Delay Budget (PDB) with a Delay Budget for SL-PRS
  Send an LS to RAN2 asking RAN2 whether they can confirm RAN1's working assumption, and if not let RAN2 decide an alternative solution.

Agreement

For the PSCCH configuration in a dedicated resource pool,
  A PSCCH is mapped in a single subchannel similar to shared resource pool and:
    the resource pool is (pre-)configured with the size of a subchannel in PRBs and the number of subchannels, and follow the legacy PSCCH mapping to resources of NR SL.
      FFS: whether to add additional values for the subchannel (pre-)configuration
    the PSCCH in the ith subchannel is associated with the ith SL-PRS resource ID
    Note: if the number of subchannels is larger than the (pre-)configured number of SL PRS resources, then subchannels with index larger than or equal to the (pre-)configured number of SL PRS resources are not mapped to any resource Agreement For Scheme 2 SL-PRS resource allocation, with regards to the congestion control for a dedicated RP, the following modifications are supported:
  Modification 1: For the definition of SL PRS CR and CBR:
    Alt. 2: redefine CBR/CR by considering the SL-PRS resource allocation/configuration.

Agreement

For Scheme 2 SL-PRS resource allocation, with regards to the congestion control for a dedicated RP, the following modifications are supported:
  Modification 2: For the evaluation of RSSI used in the CBR definition:
    SL-RSSI is measured on a slot configured for transmission of PSCCH and SL-PRS
    A single SL-RSSI is measured on symbols with both SL-PRS and PSCCH Agreement For Scheme 2 SL-PRS resource allocation, with regards to the congestion control for a dedicated RP, the following modifications are supported:
  For the CR and CBR measurement time window size,
    1. it can be separately configured for a dedicated resource pool and could take the legacy values Agreement For Scheme 2, in dedicated resource pools, with regards to the procedure for determining the subset of resources to be reported to higher layers, when triggering the resource (re-)selection procedure, the higher layers provide the following parameters for candidate SL-PRS transmission(s):
  resource pool from which to report SL-PRS resources
  Priority
  Delay budget
  Reservation period
  List of resources for pre-emption and re-evaluation
  Set of SL-PRS resource ID (s) which can include all (pre-)configured SL-PRS resource IDs Conclusion For Scheme 2, in a dedicated resource pool, with regards to the resource (re)-selection procedure, there is no consensus to support to (pre-)configured SL-PRS to derive L1 SL-RSRP for resource exclusion.

**************************** QUOTATION [7] END ******************************

For New Radio (NR) Release-16/17 sidelink design, sidelink slots can be utilized for Physical Sidelink Broadcast Channel (PSBCH) or Physical Sidelink Control Channel (PSCCH)/Physical Sidelink Shared Channel (PSSCH)/ Physical Sidelink Feedback Channel (PSFCH) transmission/ reception. PSBCH is Time Division Multiplexed (TDMed), in slot level, from PSCCH/PSSCH/PSFCH. It means that sidelink slots except slots for PSBCH can be utilized for PSCCH/PSSCH/PSFCH transmission/reception. Moreover, the concept of a sidelink resource pool for sidelink communication is utilized for PSCCH/PSSCH and/or/PSFCH transmission/reception. A sidelink (communication) resource pool will comprise a set of sidelink slots (except at least slots for PSBCH) and a set of frequency resources. Different sidelink (communication) resource pools may be TDMed and/or Frequency Division Multiplexed (FDMed). More specifically, a PSCCH in one sidelink (communication) resource pool can only schedule PSSCH resource(s) in the same one sidelink (communication) resource pool. A PSCCH in one sidelink (communication) resource pool is not able to schedule PSSCH resource(s) in other sidelink (communication) resource pool. For a PSCCH/PSSCH, an associated PSFCH is in the same sidelink (communication) resource pool, instead of in different sidelink (communication) resource pools.

One sidelink (communication) resource pool will comprise multiple sub-channels in frequency domain, wherein a sub-channel comprises multiple contiguous Physical Resource Blocks (PRBs) in frequency domain. One PRB comprises multiple Resource Elements (REs), e.g., one PRB consists of 12 REs. Configuration of the sidelink resource pool will indicate the number of PRBs of each sub-channel in the corresponding sidelink resource pool. Sub-channel based resource allocation in frequency domain is supported for PSSCH. For a PSSCH resource scheduled by a PSCCH in the same sidelink slot, fixed relationship between the PSCCH and the PSSCH resource is specified, which means that the PSCCH will be located in the lowest (index of) sub-channel of the scheduled PSSCH resource. As for a scheduled PSSCH resource in different slot(s), a starting frequency position of the scheduled PSSCH resource will be scheduled/indicated by sidelink control information, instead of a fixed relationship.

In current NR Release-16/17 sidelink design, one Sidelink Control Information (SCI) could indicate at most three PSSCH resources via Frequency resource assignment and/or Time resource assignment in the SCI. The SCI may comprise a 1st stage SCI and a 2nd stage SCI. The 1st stage SCI may be transmitted via PSCCH.

The 2nd stage SCI may be transmitted via multiplexing with the scheduled PSSCH resource in the same sidelink slot, e.g., the first PSSCH resource. In other words, the SCI can schedule at most two PSSCH resources in later sidelink slots, e.g., the second PSSCH resource and/or the third PSSCH resource. The at most three PSSCH resources are in different slots in a sidelink (communication) resource pool. The at most three PSSCH resources are within 32 consecutive slots in a sidelink resource pool. The at most three PSSCH resources are utilized/associated with a same data packet, e.g., a same Transport Block (TB) or a same Medium Access Control (MAC) Protocol Data Unit (PDU). Note that standalone PSCCH/SCI is not supported in NR sidelink, which means that for each PSSCH transmission in a slot, there will be a corresponding PSCCH/SCI transmission in the same slot, and vice versa.

Moreover, resource reservation for another/different TB by a SCI could be (pre-) configured with, enabled, or not enabled, or not configured in a sidelink (communication) resource pool. When a sidelink (communication) resource pool is configured with an enabled such resource reservation, the sidelink (communication) resource pool is configured with a set of reservation period values. A possible reservation period could be 0, 1:99, 100, 200, 300, 400, 500, 600, 700, 800, 900, 1000 ms. A resource reservation period field in an SCI in the sidelink (communication) resource pool could indicate which reservation period value for (future) resource reservation. The size/number of the set of reservation period values could be from 1 to 16.

In current NR Release-16/17 sidelink design, there are two sidelink resource allocation modes defined for NR sidelink communication:
1. Mode 1 is that a base station/network node can schedule sidelink resource(s) to be used by a User Equipment (UE) for sidelink transmission(s); or
2. Mode 2 is that a UE determines (i.e., base station/network node does not schedule) sidelink transmission resource(s) within sidelink resources configured by a base station/network node or pre-configured sidelink resources.

For network scheduling mode, e.g., NR sidelink resource allocation mode 1, the network node may transmit a Sidelink (SL) grant, e.g., Downlink Control Information (DCI) format 3_0, on Uu interface for scheduling at most three PSSCH resources (for a same data packet). The sidelink grant also comprises "resource pool index" for indicating one sidelink (communication) resource pool, wherein the scheduled at most three PSSCH resources are within the indicated one sidelink (communication) resource pool. The Transmission (TX) UE may perform PSCCH and PSSCH transmissions on PC5 interface, in response to the received SL grant, for a data packet. The Uu interface means the wireless interface for communication between a network and a UE. The PC5 interface means the wireless interface for communication (directly) between UEs/devices.

For UE (autonomous) selection mode, e.g., NR sidelink resource allocation mode 2, since a transmission resource is not scheduled via the network node, the UE may require performing sensing before selecting a resource for transmission (e.g., sensing-based transmission), in order to avoid resource collision and interference from or to other UEs (especially UEs using NR sidelink). Full sensing is supported from NR Rel-16 sidelink, while partial sensing is supported from NR Rel-17 sidelink. Based on result of the sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission.

When sensing-based resource selection is triggered/requested in slot n, (the Physical layer of) the UE will have a (initial) set of candidate single-slot resources comprising multiple candidate single-slot resources. The available (initial) set of candidate single-slot resources is restricted with a time interval $[n+T_1, n+T_2]$, which may be called a resource selection window. Preferably in certain embodiments, one candidate single-slot resource may comprise one or multiple frequency resource units within one slot, wherein the frequency resource unit may be a sub-channel. As specified in TS 38.214 (e.g., [2] 3GPP TS 38.214 V18.0.0 (2023-09) 3GPP), a candidate single-slot resource for transmission $R_{x,y}$ is defined as a set of $L_{subCH}$ contiguous sub-channels with sub-channel x+j in slot $t'^{SL}_y$ where $j=0, \ldots, L_{subCH}-1$.

If full sensing is performed (e.g., [2] 3GPP TS 38.214 V18.0.0 (2023 September) 3GPP), e.g., partially sensing is not configured, the (initial) set of candidate single-slot resources are in the (full) time interval $[n+T_1, n+T_2]$. The (Physical layer of the) UE shall monitor/sense slots within sensing window $[n-T_0, n-T_{proc,0}^{SL})$.

When partial sensing is performed/configured (e.g., [2] 3GPP TS 38.214 V18.0.0 (2023 September) 3GPP), (the Physical layer of) the UE determines by its implementation a set of candidate slots which consists of at least Y candidate slots within the time interval $[n+T_1, n+T_2]$, wherein the (initial) set of candidate single-slot resources are in the set of slots. For periodic-based partial sensing, if a slot $t'^{SL}_y$ is in the set of candidate slots, (the Physical layer of) the UE shall monitor/sense any slot $t'^{SL}_{y-k \times P'_{reserve}}$ within the sensing window. For contiguous partial sensing, (the Physical layer of) the UE shall monitor/sense slots $[n+T_A, n+T_B]$ within the sensing window, wherein $T_A$ and $T_B$ are both selected such that (the Physical layer of) the UE has sensing results starting at least M consecutive logical slots before the first slot of the selected Y candidate slots.

Based on the sensing result, (the Physical layer of) the UE may generate a valid/identified resource set, wherein the valid/identified resource set is a subset of the (initial) set of candidate single-slot resources. The generation of the valid/identified resource set may be performed via excluding some candidate single-slot resources from the (initial) set of candidate single-slot resources. If remaining candidate single-slot resources after exclusion steps is smaller than X (e.g., either of 20%, 35%, 50% depending on $prio_{TX}$, which association is configured in sidelink resource pool configuration) of the number of the (initial) set of candidate single-slot resources, the UE may re-perform the exclusion step via increasing the power threshold by 3 dB. After then, (the Physical layer of) the UE can determine the valid/identified resource set. The resource selection for sidelink transmission, performed by the higher layer (MAC layer) of the UE, may be randomly selected from the valid/identified resource set.

Note that for sidelink, a priority value is any of 1 to 8, and a lower priority value means higher priority.

In NR Release 18 (e.g., [4] RP-231460), "NR Positioning Enhancements" will investigate higher accuracy, lower latency location, high integrity and reliability requirements resulting from new applications and industry verticals for 5G. It will also study feasibility of potential solutions for SL positioning, considering relative positioning, ranging and absolute positioning, wherein the SL positioning is operated in a device-to-device interface or said PC5-interface between a device and a device. The device can mean or replaced as a UE.

RAN1 agreed to study Round-Trip Time (RTT)-type solutions using SL, SL-Angle of Arrival (AoA), SL-Time Difference Of Arrival (TDOA), SL-Angle of Departure (AoD) with regard to positioning methods supported using SL measurements. Accordingly, a new reference signal for SL positioning/ranging, noted as SL Positioning Reference Signal (PRS), will be introduced. For supporting time-based positioning methods, larger bandwidth for SL PRS is required for higher accuracy positioning. It is quite possible that the required bandwidth for SL PRS may be 10 MHz, 20 MHz, or even more, especially in higher frequency bands. With regard to the SL Positioning resource allocation, there are two kinds of sidelink resource pools: Dedicated resource pools for SL-PRS and Shared resource pools with sidelink communication (i.e., PSCCH/PSSCH and/or PSFCH). Shared resource pools with sidelink communication means that SL PRS transmission(s) can be multiplexed with PSCCH/PSSCH/PSFCH resources in the shared resource pool.

Moreover, sidelink control information by a TX UE may schedule/indicate/allocate SL PRS resources, in order to let a Reception (RX) UE know where/when to receive/measure a corresponding SL PRS. The sidelink control information for scheduling/indicating/allocating SL PRS resources may be transmitted on PSCCH in the dedicated resource pool for SL-PRS, or be transmitted on PSCCH and/or 2-nd stage SCI in the shared resource pool.

Furthermore, given the larger bandwidth requirement of SL PRS, Comb-N SL-PRS design can be supported for providing more available SL PRS resources, and a configured/adjusted symbol number can be supported as one SL PRS occasion. The potential candidate value of N may be 1, 2, 4, 6, and there are at least some possible designs of SL PRS patterns, given M symbol and comb-N:

1. Fully staggered SL-PRS pattern, M=N, and at each symbol a different RE offset is used, or
2. Partially staggered SL-PRS pattern, M<N, at each symbol a different RE offset is used, or
3. Unstaggered SL-PRS patterns, N>1, at each symbol a same RE offset is used Preferably in certain embodiments, for comb-N SL-PRS design/structure, possible frequency/comb offsets may be 0 to (N−1).

For SL PRS resource allocation, scheme 1 and scheme 2 are introduced.

1. Scheme 1: Network-centric operation SL-PRS resource allocation (e.g., similar to a legacy NR Mode 1 solution),
    a. The network (e.g., Next Generation Node B (gNB), Location Management Function (LMF), gNB & LMF) allocates resources for SL-PRS.
2. Scheme 2: TX UE autonomous SL-PRS resource allocation (e.g., similar to legacy NR Mode 2 solution),
    a. At least one of the UE(s) participating in the sidelink positioning operation allocates resources for SL-PRS.

For scheme 1, the network node may transmit an SL grant, e.g., DCI format 3_2, for scheduling SL PRS resource(s) in the dedicated resource pool. The network node may transmit an SL grant, e.g., DCI format 3_0, for scheduling PSSCH resource(s) in the shared resource pool, and the TX UE determines whether to multiplex the SL PRS transmission in the scheduled PSSCH resource(s).

For dedicated resource pool in scheme 2, the TX UE may perform sensing on SL PRS resources in sensing duration, and then exclude candidate SL PRS resources based on the sensing result. After the exclusion step, the TX UE may determine valid candidate SL PRS resources and then randomly select some candidate SL PRS resource(s) from that. For shared resource pool in scheme 2, the TX UE may perform sensing, determine valid candidate PSSCH resources and then randomly select some candidate PSSCH resource(s) from that (following legacy NR Mode). The TX UE determines whether to multiplex SL PRS transmission in the selected PSSCH resource(s). For the Dedicated resource pool for SL-PRS, it is agreed to support TDM-based multiplexing of SL PRS within a slot, wherein the maximum number of TDMed SL PRS occasions within the slot is 4 (e.g., [6] RAN1 Chair's Notes of 3GPP TSG RAN WG1 #113).

As specified in TS 38.214 (e.g., [2] 3GPP TS 38.214 V18.0.0 (2023 September) 3GPP), when sensing-based resource selection for PSSCH resource(s) is triggered/requested in slot n, the UE will determine a (initialized) set of candidate single-slot resources comprising multiple candidate single-slot resources which are restricted with time interval $[n+T_1, n+T_2]$ (i.e., resource selection window). The UE may exclude some candidate single-slot resources from the (initialized) set of candidate single-slot resources, based on sensing results. After exclusion, the UE can determine a valid/identified resource set to be reported to the higher layer of the UE. The higher layer of the UE may (randomly) select one or multiple valid/identified resources from the valid/identified resource set to perform PSSCH transmission(s) carrying SL MAC PDU. Considering a latency requirement, when sensing-based resource selection for PSSCH resource(s) is triggered/requested, the higher layer of the UE will provide a remaining Packet Delay Budget (PDB) of SL data available in the logical channel(s), wherein the remaining PDB is utilized to determine the ending time of the time interval $[n+T_1, n+T_2]$. The SL data available in the logical channel(s) may be transmitted via the PSSCH transmission(s) on the selected one or multiple valid/identified resources (i.e., the SL data available in the logical channel(s) may be comprised/included in the SL MAC PDU). If $T_{2min}$ is shorter than the remaining PDB (in slots) then $T_2$ is up to UE implementation subject to $T_{2min} \leq T_2 \leq$ remaining PDB (in slots); otherwise $T_2$ is set to the remaining PDB (in slots). Moreover, when the UE (randomly) selects the one or multiple valid/identified resources from the valid/identified resource set, the UE will consider the remaining PDB and/or the latency requirement of the triggered SL-Channel State Information (CSI) reporting (e.g., when the SL MAC PDU comprises/includes the triggered SL-CSI reporting) and/or the latency requirement of the Sidelink Inter-UE Coordination Information transmission (e.g., when the SL MAC PDU comprises/includes the Sidelink Inter-UE Coordination Information).

Regarding SL PRS in scheme 2 in the dedicated resource pool, the UE may perform sensing-based resource selection for SL PRS resource(s), which is designed via using sensing-based resource selection for PSSCH resource(s) as a starting point and considering some modifications. As agreements in RAN1 #112bis (e.g., [5] RAN1 Chair's Notes of 3GPP TSG RAN WG1 #112bis), RAN1 #114 (e.g., [7] RAN1 Chair's Notes of 3GPP TSG RAN WG1 #114), and specified in TS 38.214 (e.g., [2] 3GPP TS 38.214 V18.0.0 (2023-09) 3GPP), one modification is to substitute the PDB with a new delay budget for SL PRS. It is because SL PRS does not belong to SL data in/from sidelink logical channel(s), there is no PDB for SL PRS. The new delay budget for SL PRS may mean/represent a latency requirement of the SL PRS transmission, thus the selected SL PRS resources(s) can ensure to satisfy latency requirements of the SL PRS transmission.

Regarding SL PRS in scheme 2 in the shared resource pool, since SL PRS transmission is multiplexed with PSSCH, the UE can perform sensing-based resource selection for PSSCH resource(s) and multiplex SL PRS transmission(s) with PSSCH transmission(s) on selected PSSCH resource(s). However, the new delay budget for SL PRS is not considered in the sensing-based resource selection for PSSCH resource(s) in the shared resource pool as specified in TS 38.214 (e.g., [2] 3GPP TS 38.214 V18.0.0 (2023 September) 3GPP), it is possible that the selected PSSCH resource(s) cannot satisfy latency requirements of the SL PRS transmission.

To deal with these issues, some concepts, mechanisms, methods, or embodiments are provided in the following disclosure.

A UE may receive/have configuration of a sidelink resource pool for PSSCH transmission/reception and SL PRS transmission/reception.

The UE may perform a first sensing-based resource selection, triggered/requested in a first slot n, for selecting one or more sidelink resources in the sidelink resource pool. The UE may determine a procedure for determining a subset of sidelink resources, and select the one or more sidelink resources from the subset of sidelink resources.

The UE may determine a (initialized) set of candidate single-slot resources comprising multiple candidate single-slot resources within time interval $[n+T_1, n+T_2]$. The time interval $[n+T_1, n+T_2]$ may be called/noted as a resource selection window.

The UE may exclude some candidate single-slot resources from the (initialized) set of candidate single-slot resources, based on sensing results. After exclusion, the UE can determine the subset of sidelink resources to be reported to the higher layer of the UE. The higher layer of the UE may (randomly) select the one or more sidelink resources from the reported subset of sidelink resources.

The UE may perform a first PSSCH transmission carrying a first SL MAC PDU and perform a first SL PRS transmission on a first sidelink resource of the selected one or more sidelink resources. Preferably in certain embodiments, the first SL PRS transmission is multiplexed with the first PSSCH transmission on the first sidelink resource.

Concept A

The concept A is that the UE may determine the time interval $[n+T_1, n+T_2]$ based on a (remaining) packet delay budget and a (remaining) delay budget associated with the first SL PRS. Preferably in certain embodiments, the UE may determine the $T_2$ based on the (remaining) packet delay budget and the (remaining) delay budget associated with the first SL PRS.

Preferably in certain embodiments, the SL MAC PDU may comprise SL data in/from sidelink logical channel(s). The packet delay budget may be determined/associated with the SL data or the sidelink logical channel(s).

Preferably in certain embodiments, the delay budget associated with the first SL PRS may be provided by the higher layer, e.g., Sidelink Long Term Evolution (LTE) Positioning Protocol (SLPP) or application layer. Preferably in certain embodiments, the first SL PRS may not belong to SL data. Preferably in certain embodiments, the first SL PRS may not belong to sidelink logical channels for SL data. Preferably in certain embodiments, the SL MAC PDU does not comprise the first SL PRS.

In one embodiment A1, the UE may determine the $T_2$ and/or the resource selection window based on a smaller/shorter one of the (remaining) packet delay budget and the (remaining) delay budget associated with the first SL PRS.

Preferably in certain embodiments, when the (remaining) packet delay budget is smaller/shorter than (or equal to) the (remaining) delay budget associated with the first SL PRS, the UE may determine the $T_2$ and/or the resource selection window based on the (remaining) packet delay budget. Preferably in certain embodiments, when $T_{2min}$ is shorter than the remaining packet delay budget (in slots), the $T_2$ is up to UE implementation subject to $T_{2min} \leq T_2 \leq$ the (remaining) packet delay budget (in slots). When the remaining packet delay budget (in slots) is shorter than the $T_{2min}$, the $T_2$ is set to the (remaining) packet delay budget (in slots).

Preferably in certain embodiments, when the (remaining) delay budget associated with the first SL PRS is smaller/shorter than (or equal to) the (remaining) packet delay budget, the UE may determine the $T_2$ and/or the resource selection window based on the (remaining) delay budget associated with the first SL PRS. Preferably in certain embodiments, when $T_{2min}$ is shorter than the (remaining) delay budget associated with the first SL PRS (in slots), the $T_2$ is up to UE implementation subject to $T_{2min} \leq T_2 \leq$ the (remaining) delay budget associated with the first SL PRS (in slots). When the (remaining) delay budget associated with the first SL PRS (in slots) is shorter than the $T_{2min}$, the $T_2$ is set to the (remaining) delay budget associated with the first SL PRS (in slots).

In one embodiment A2, the UE may determine the $T_2$ and/or the resource selection window based on one, with smaller priority value, of the (remaining) packet delay budget and the (remaining) delay budget associated with the first SL PRS. Preferably in certain embodiments, the SL MAC PDU or the SL data may be associated with a first priority value. The first SL PRS may be associated with a second priority value.

Preferably in certain embodiments, when the first priority value is smaller than (or equal to) the second priority value, the UE may determine the $T_2$ and/or the resource selection window based on the (remaining) packet delay budget. Preferably in certain embodiments, when $T_{2min}$ is shorter than the remaining packet delay budget (in slots), the $T_2$ is up to UE implementation subject to $T_{2min} \leq T_2 \leq$ the (remaining) packet delay budget (in slots). When the remaining packet delay budget (in slots) is shorter than the $T_{2min}$, the $T_2$ is set to the (remaining) packet delay budget (in slots).

Preferably in certain embodiments, when the second priority value is smaller than (or equal to) the first priority value, the UE may determine the $T_2$ and/or the resource selection window based on the (remaining) delay budget associated with the first SL PRS. Preferably in certain embodiments, when $T_{2min}$ is shorter than the (remaining) delay budget associated with the first SL PRS (in slots), the $T_2$ is up to UE implementation subject to $T_{2min} \leq T_2 \leq$ the (remaining) delay budget associated with the first SL PRS (in slots). When the (remaining) delay budget associated with the first SL PRS (in slots) is shorter than the $T_{2min}$, the $T_2$ is set to the (remaining) delay budget associated with the first SL PRS (in slots).

For each embodiment, when the UE performs a second sensing-based resource selection for second PSSCH transmission without multiplexing SL PRS in the sidelink resource pool, the UE may determine corresponding $T_2$ and/or corresponding resource selection window based on (remaining) packet delay budget and not based on (remaining) delay budget associated with SL PRS.

Concept B

The UE may determine the time interval $[n+T_1, n+T_2]$ based on a (remaining) packet delay budget. The UE may or may not determine the time interval $[n+T_1, n+T_2]$ based on a (remaining) delay budget associated with the first SL PRS. Preferably in certain embodiments, the UE may determine the $T_2$ based on the (remaining) packet delay budget. The UE may or may not determine the $T_2$ based on the (remaining) delay budget associated with the first SL PRS.

Preferably in certain embodiments, the SL MAC PDU may comprise SL data in/from sidelink logical channel(s). The packet delay budget may be determined/associated with the SL data or the sidelink logical channel(s).

Preferably in certain embodiments, the delay budget associated with the first SL PRS may be provided by higher layer, e.g., SLPP or application layer. Preferably in certain embodiments, the first SL PRS may not belong to SL data. Preferably in certain embodiments, the first SL PRS may not belong to sidelink logical channels for SL data. Preferably in certain embodiments, the SL MAC PDU does not comprise the first SL PRS. Preferably in certain embodiments, the delay budget associated with the first SL PRS may mean/represent/replace as latency requirement of the first SL PRS.

The concept B is that when the UE (randomly) selects the one or more sidelink resources from the reported subset of sidelink resources, the UE may select the one or more sidelink resources according to at least the (remaining) packet delay budget and the (remaining) delay budget associated with the first SL PRS. Preferably in certain embodiments, the UE may select the one or more sidelink resources such that the one or more sidelink resources are within at least the (remaining) packet delay budget and the (remaining) delay budget associated with the first SL PRS. Preferably in certain embodiments, the one or more sidelink resources are within the (remaining) packet delay budget. And the one or more sidelink resources are within the (remaining) delay budget associated with the first SL PRS.

Preferably in certain embodiments, when the UE performs a second sensing-based resource selection for second PSSCH transmission without multiplexing SL PRS in the sidelink resource pool, the UE may select the one or more sidelink resources according to at least the (remaining) packet delay budget. The UE may select the one or more sidelink resources not according to the (remaining) delay budget associated with the SL PRS.

One possible text proposal with underline for TS 38.321 can be:

\*\*\*\*\*\*\*\*\*\*\*\*\*\*\*\*\*\*\*\*\*\*\*\*\*\*\*\*\*\*\*\*\* START of Text Proposal\*\*\*\*\*\*\*\*\*\*\*\*\*\*\*\*\*\*\*\*\*\*\*\*\*\*\*\*\*\*\*\*\*\*

3> if sl-InterUE-CoordinationScheme1 enabling reception/transmission of preferred resource set and non-preferred resource set is not configured by RRC:
    4> if transmission based on random selection is configured by upper layers:
      5> randomly select the time and frequency resources for one transmission opportunity from the resources pool which occur within the SL DRX Active time, if configured, as specified in clause 5.28.2 of the destination UE selected for indicating to the physical layer the SL DRX Active time above, according to the amount of selected frequency resources and the remaining PDB of SL data available in the logical channel(s) allowed on the carrier, and/or latency requirement of triggered SL PRS, and the latency requirement of the triggered SL CSI reporting.
  . . .
  3> if sl-InterUE-CoordinationScheme1 enabling reception/transmission of preferred resource set and non-preferred resource set is configured by RRC and when the UE determines the resources for Sidelink Inter-UE Coordination Information transmission upon explicit request from a UE:
    4> randomly select the time and frequency resources for one transmission opportunity from the resources indicated by the physical layer as specified in clause 8.1.4 of TS 38.214 [7], according to the amount of selected frequency resources, the remaining PDB of SL data available in the logical channel(s) allowed on the carrier, and/or latency requirement of triggered SL PRS, and/or the latency requirement of the triggered SL-CSI and the latency requirement of the Sidelink Inter-UE Coordination Information transmission.

\*\*\*\*\*\*\*\*\*\*\*\*\*\*\*\*\*\*\*\*\*\*\*\*\*\*\*\*\*\*\* END of Text Proposal\*\*\*\*\*\*\*\*\*\*\*\*\*\*\*\*\*\*\*\*\*\*\*\*\*\*\*\*\*\*\*\*

Note that any of the above and herein methods, alternatives, concepts, examples, and embodiments may be combined, in whole or in part, or applied simultaneously or separately.

For the methods, alternatives, concepts, examples, and embodiments detailed above and herein, the following aspects and embodiments are possible.

Preferably in certain embodiments, the SL PRS may be SL Channel State Information Reference Signal (CSI-RS).

Preferably in certain embodiments, the SL PRS is not SL CSI-RS.

Preferably in certain embodiments, the SL PRS may be represented/replaced as a sidelink reference signal.

Preferably in certain embodiments, the sidelink reference signal may be applied/utilized for (absolute and/or relative) positioning and/or ranging.

Preferably in certain embodiments, the sidelink reference signal may be applied/utilized for any of time-based positioning/ranging methods and/or angle-based positioning/ranging methods. Preferably in certain embodiments, the sidelink reference signal may be applied/utilized for any of TDoA, RTT-based positioning/ranging, AoA, AoD, or carrier phase measurement based positioning Preferably in certain embodiments, the sidelink reference signal may be SL beam management RS. Preferably in certain embodiments, the sidelink reference signal may be SL CSI-RS (for beam management), which is not combined within a PSSCH (bandwidth) in frequency domain. Preferably in certain embodiments, the sidelink reference signal may require large bandwidth. Preferably in certain embodiments, the sidelink reference signal may be utilized for (High-Resolution) localization, sensing, or imaging. Preferably in certain embodiments, the sidelink reference signal may be utilized for beam management (e.g., in Frequency Range (FR)2).

Preferably in certain embodiments, any of above and herein concepts, methods, examples, alternatives, and embodiments for SL PRS may be applied for other/another reference signal (e.g., reference signal designed/introduced in future 5G, 6G, or etc.).

Preferably in certain embodiments, any of above and herein concepts, methods, examples, alternatives, and embodiments for SL PRS may be applied for SL CSI-RS (for beam management).

Preferably in certain embodiments, any of above and herein concepts, methods, examples, alternatives, and embodiments for SL PRS may be applied for reference signal for (High-Resolution) localization (e.g., reference signal designed/introduced in future 5G, 6G, or etc.).

Preferably in certain embodiments, any of above and herein concepts, methods, examples, alternatives, and embodiments for SL PRS may be applied for reference signal for (High-Resolution) sensing (e.g., reference signal designed/introduced in future 5G, 6G, or etc.).

Preferably in certain embodiments, any of above and herein concepts, methods, examples, alternatives, and embodiments for SL PRS may be applied for reference signal for (High-resolution) imaging (e.g., reference signal designed/introduced in future 5G, 6G, or etc.).

Preferably in certain embodiments, the sidelink resource pool for PSSCH transmission/reception and SL PRS transmission/reception may be a sidelink (communication) resource pool for PSSCH transmission/reception and enabled/configured/supported for SL PRS transmission/reception/measurement.

Preferably in certain embodiments, the dedicated resource pool for SL PRS may be a sidelink resource pool comprising/providing at least SL PRS resources and/or sidelink control resources. Preferably in certain embodiments, the dedicated resource pool for the SL PRS does not comprise sidelink data resources (i.e., does not comprise PSSCH resources). Preferably in certain embodiments, the dedicated resource pool for SL PRS does not comprise sidelink feedback resources.

Preferably in certain embodiments, PSSCH may mean sidelink data transmission.

Preferably in certain embodiments, PSFCH may mean sidelink feedback transmission.

Preferably in certain embodiments, PSCCH may mean sidelink control transmission.

Preferably in certain embodiments, for transmitting PSSCH in a slot or subslot, the TX UE needs to transmit SCI in the slot or the subslot for scheduling the PSSCH.

Preferably in certain embodiments, for transmitting SL PRS in a slot or subslot, the TX UE needs to transmit SCI in the slot or the subslot for scheduling the SL PRS.

Preferably in certain embodiments, the slot may mean a sidelink slot. Preferably in certain embodiments, the slot may be represented/replaced as a Transmission Time Interval (TTI).

Preferably in certain embodiments, the sidelink slot may mean slot for sidelink. Preferably in certain embodiments, a TTI may be a subframe (for sidelink) or slot (for sidelink) or sub-slot (for sidelink). Preferably in certain embodiments, a TTI comprises multiple symbols, e.g., 12 or 14 symbols. Preferably in certain embodiments, a TTI may be a slot (fully/partially) comprising sidelink symbols. Preferably in certain embodiments, a TTI may mean a transmission time interval for a sidelink (data) transmission. Preferably in certain embodiments, a sidelink slot or a slot for sidelink may contain all Orthogonal Frequency Division Multiplexing (OFDM) symbols available for sidelink transmission. Preferably in certain embodiments, a sidelink slot or a slot for sidelink may contain a consecutive number of symbols available for sidelink transmission. Preferably in certain embodiments, a sidelink slot or a slot for sidelink means that a slot is included/comprised in a sidelink resource pool.

Preferably in certain embodiments, the symbol may mean a symbol indicated/configured for sidelink.

Preferably in certain embodiments, the slot may mean/comprise a sidelink slot associated with the (sidelink) resource pool. Preferably in certain embodiments, the slot may not mean/comprise a sidelink slot associated with other (sidelink) resource pool.

Preferably in certain embodiments, the contiguous/consecutive slots may mean contiguous sidelink slots in/for the (sidelink) resource pool.

Preferably in certain embodiments, the contiguous/consecutive slots may or may not be contiguous/consecutive in physical slots. It means that the contiguous/consecutive slots in the sidelink resource pool may be not contiguous/consecutive from the aspect of physical slots. Preferably in certain embodiments, the contiguous/consecutive slots may or may not be contiguous/consecutive in sidelink slots in/for a sidelink Bandwidth Part (BWP) or a sidelink carrier/cell. It means that the contiguous/consecutive slots in the (sidelink) resource pool may be not contiguous/consecutive from the aspect of sidelink slots in a sidelink BWP or a sidelink carrier/cell. Preferably in certain embodiments, there may be one or more (sidelink) resource pools in a sidelink BWP or a sidelink carrier/cell.

Preferably in certain embodiments, a sub-channel is a unit for sidelink resource allocation/scheduling (for PSSCH). Preferably in certain embodiments, a sub-channel may comprise multiple contiguous PRBs in frequency domain. Preferably in certain embodiments, the number of PRBs for each sub-channel may be (pre-) configured for a sidelink resource pool. Preferably in certain embodiments, a sidelink resource pool (pre-) configuration may indicate/configure the number of PRBs for each sub-channel. Preferably in certain embodiments, the number of PRBs for each sub-channel may be any of 10, 12, 15, 20, 25, 50, 75, 100. Preferably in certain embodiments, a sub-channel may be represented as a unit for sidelink resource allocation/scheduling. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the first UE may have/maintain/establish multiple sidelink links/connections on PC5 interface. For different sidelink links/connections, the first UE may perform sidelink transmission/reception to/from different paired UE(s).

Preferably in certain embodiments, the first UE may have/maintain/establish a first sidelink link/connection and a second sidelink link/connection. The paired UE of the first sidelink link/connection may be different from the paired UE of the second sidelink link/connection. Preferably in certain embodiments, the sidelink logical channel(s) associated with (the paired UE of) the first sidelink link/connection are separate/independent from the sidelink logical channel(s) associated with (the paired UE of) the second sidelink link/connection.

Preferably in certain embodiments, the UE may be/mean/comprise/replace a device.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be Vehicle-to-Everything (V2X) transmission/reception. Preferably in certain embodiments, the sidelink transmission/reception may be Pedestrian-to-Everything (P2X) transmission/reception. Preferably in certain embodiments, the sidelink transmission/reception may be on PC5 interface.

Preferably in certain embodiments, the PC5 interface may be a wireless interface for communication between device and device. Preferably in certain embodiments, the PC5 interface may be a wireless interface for communication between devices. Preferably in certain embodiments, the PC5 interface may be a wireless interface for communication between UEs. Preferably in certain embodiments, the PC5 interface may be a wireless interface for V2X or P2X communication. Preferably in certain embodiments, the Uu interface may be a wireless interface for communication between network node and device. Preferably in certain embodiments, the Uu interface may be a wireless interface for communication between network node and UE.

Preferably in certain embodiments, the first UE may be a first device. Preferably in certain embodiments, the first UE may be a vehicle UE. Preferably in certain embodiments, the first UE may be a V2X UE.

Preferably in certain embodiments, the second UE may be a second device. Preferably in certain embodiments, the second UE may be a vehicle UE. Preferably in certain embodiments, the second device may be a V2X UE.

Preferably in certain embodiments, the first UE and the second device are different devices.

Various examples and embodiments of the present invention are described below.

Figure 5:
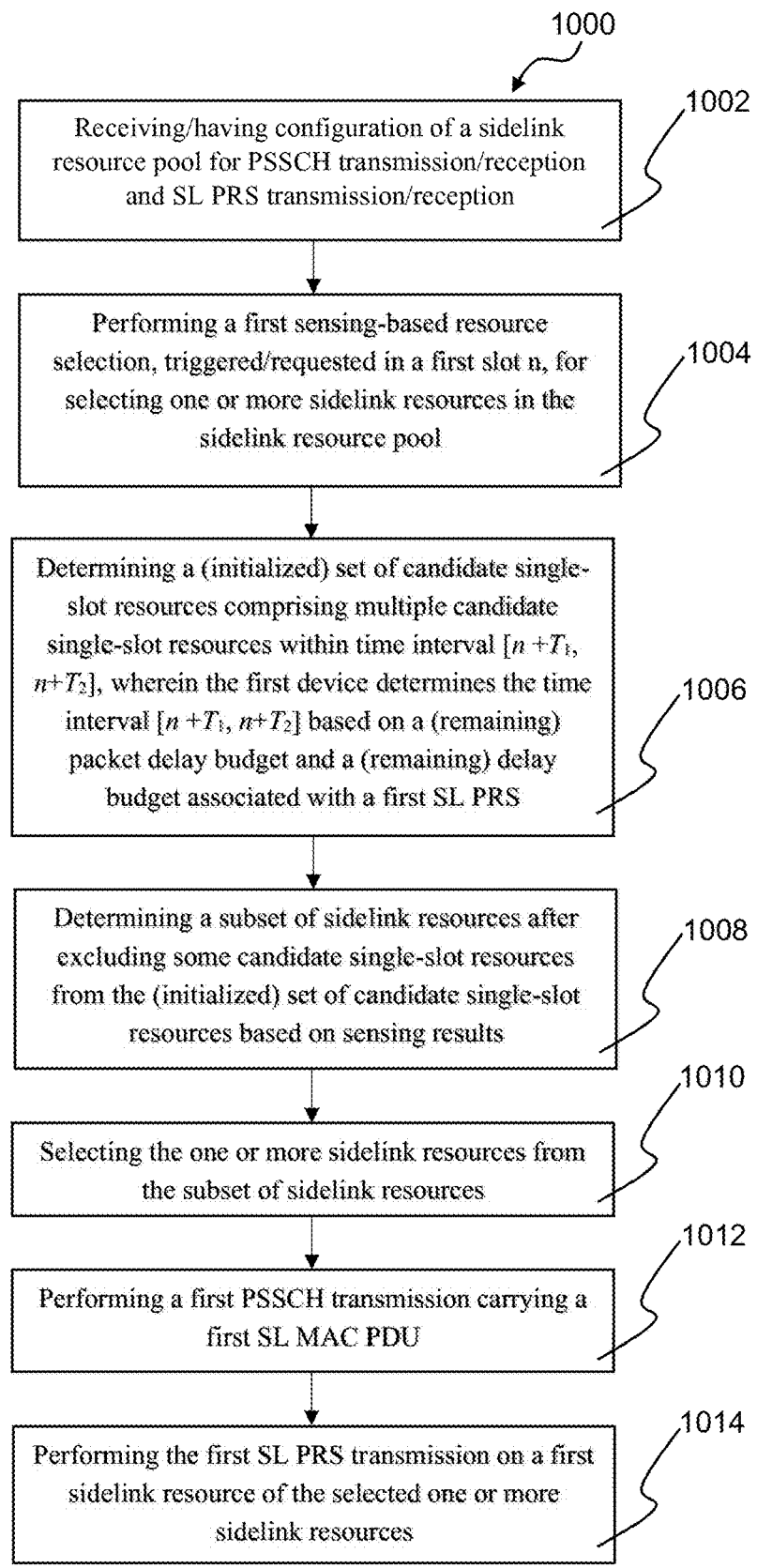
FIG. 5 is a flow diagram of a method of a first device comprising receiving/having configuration of a sidelink resource pool for PSSCH transmission/reception and SL PRS transmission/reception, performing a first sensing-based resource selection, triggered/requested in a first slot n, for selecting one or more sidelink resources in the sidelink resource pool, determining a (initialized) set of candidate single-slot resources comprising multiple candidate single-slot resources within time interval [n+$T_1$, n+$T_2$], determining a subset of sidelink resources after excluding some candidate single-slot resources from the (initialized) set of candidate single-slot resources based on sensing results, selecting the one or more sidelink resources from the subset of sidelink resources, performing a first PSSCH transmission carrying a first SL MAC PDU, and performing the first SL PRS transmission on a first sidelink resource of the selected one or more sidelink resources, in accordance with embodiments of the present invention.

Referring to FIG. 5, with this and other concepts, systems, and methods of the present invention, a method 1000 for a first device in a wireless communication system comprises receiving/having configuration of a sidelink resource pool for PSSCH transmission/reception and SL PRS transmission/reception (step 1002), performing a first sensing-based resource selection, triggered/requested in a first slot n, for selecting one or more sidelink resources in the sidelink resource pool (step 1004), determining a (initialized) set of candidate single-slot resources comprising multiple candidate single-slot resources within time interval [n+$T_1$, n+$T_2$], wherein the first device determines the time interval [n+$T_1$, n+$T_2$] based on a (remaining) packet delay budget and a (remaining) delay budget associated with a first SL PRS (step 1006), determining a subset of sidelink resources after excluding some candidate single-slot resources from the (initialized) set of candidate single-slot resources based on sensing results (step 1008), selecting the one or more sidelink resources from the subset of sidelink resources (step 1010), performing a first PSSCH transmission carrying a first SL MAC PDU (step 1012), and performing the first SL PRS transmission on a first sidelink resource of the selected one or more sidelink resources (step 1014).

In various embodiments, the first SL PRS transmission is multiplexed with the first PSSCH transmission on the first sidelink resource.

In various embodiments, the SL MAC PDU comprises SL data in/from sidelink logical channel(s), and/or the packet delay budget is determined/associated with the SL data or the sidelink logical channel(s).

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive/have configuration of a sidelink resource pool for PSSCH transmission/reception and SL PRS transmission/reception; (ii) perform a first sensing-based resource selection, triggered/requested in a first slot n, for selecting one or more sidelink resources in the sidelink resource pool; (iii) determine a (initialized) set of candidate single-slot resources comprising multiple candidate single-slot resources within time interval [n+$T_1$, n+$T_2$], wherein the first device determines the time interval [n+$T_1$, n+$T_2$] based on a (remaining) packet delay budget and a (remaining) delay budget associated with a first SL PRS; (iv) determine a subset of sidelink resources after excluding some candidate single-slot resources from the (initialized) set of candidate single-slot resources based on sensing results; (v) select the one or more sidelink resources from the subset of sidelink resources; (vi) perform a first PSSCH transmission carrying a first SL MAC PDU; and (vii) perform the first SL PRS transmission on a first sidelink resource of the selected one or more sidelink resources. Moreover, the CPU 308 can execute the program code 312 to perform all of the described actions, steps, and methods described above, below, or otherwise herein.

Figure 6:
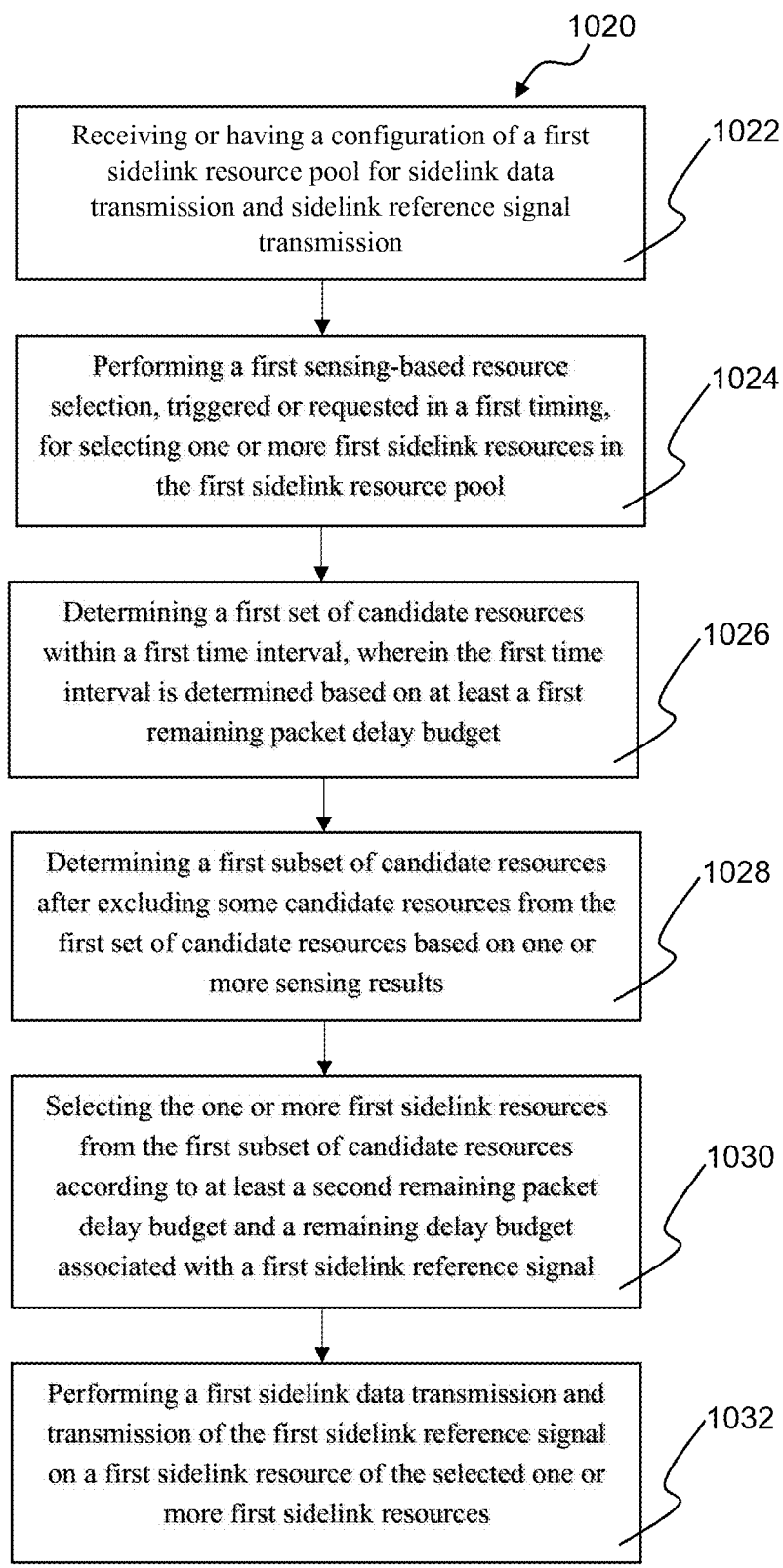
FIG. 6 is a flow diagram of a method of a first device comprising receiving or having a configuration of a first sidelink resource pool for sidelink data transmission and sidelink reference signal transmission, performing a first sensing-based resource selection, triggered or requested in a first timing, for selecting one or more first sidelink resources in the first sidelink resource pool, determining a first set of candidate resources within a first time interval, determining a first subset of candidate resources after excluding some candidate resources from the first set of candidate resources based on one or more sensing results, selecting the one or more first sidelink resources from the first subset of candidate resources according to at least a second remaining packet delay budget and a remaining delay budget associated with a first sidelink reference signal, and performing a first sidelink data transmission and transmission of the first sidelink reference signal on a first sidelink resource of the selected one or more first sidelink resources, in accordance with embodiments of the present invention.

Referring to FIG. 6, with this and other concepts, systems, and methods of the present invention, a method 1020 for a first device in a wireless communication system comprises receiving or having a configuration of a first sidelink resource pool for sidelink data transmission and sidelink reference signal transmission (step 1022), performing a first sensing-based resource selection, triggered or requested in a first timing, for selecting one or more first sidelink resources in the first sidelink resource pool (step 1024), determining a first set of candidate resources within a first time interval, wherein the first time interval is determined based on at least a first remaining packet delay budget (step 1026), determining a first subset of candidate resources after excluding some candidate resources from the first set of candidate resources based on one or more sensing results (step 1028), selecting the one or more first sidelink resources from the first subset of candidate resources according to at least a second remaining packet delay budget and a remaining delay budget associated with a first sidelink reference signal (step 1030), and performing a first sidelink data transmission and transmission of the first sidelink reference signal on a first sidelink resource of the selected one or more first sidelink resources (step 1032).

In various embodiments, the first device determines the first time interval not based on the remaining delay budget associated with the first sidelink reference signal. For determining the first time interval, the first device does not consider the remaining delay budget associated with the first sidelink reference signal.

In various embodiments, selecting the one or more first sidelink resources according to at least the second remaining packet delay budget and the remaining delay budget associated with the first sidelink reference signal comprises or means selecting the one or more first sidelink resources based on a shorter one of the second remaining packet delay budget and the remaining delay budget associated with the first sidelink reference signal, and/or selecting the one or more first sidelink resources according to at least the second remaining packet delay budget and the remaining delay budget associated with the first sidelink reference signal comprises or means selecting the one or more first sidelink resources such that the one or more first sidelink resources are within the second remaining packet delay budget and within the remaining delay budget associated with the first sidelink reference signal, and/or selecting the one or more first sidelink resources according to at least the second remaining packet delay budget and the remaining delay budget associated with the first sidelink reference signal comprises or means selecting the one or more first sidelink resources such that the one or more first sidelink resources are within the shorter one of the second remaining packet delay budget and the remaining delay budget associated with the first sidelink reference signal.

In various embodiments, the first sidelink data transmission includes a first sidelink data packet, which comprises sidelink data in or from a sidelink logical channel, and/or the first remaining packet delay budget is determined or associated with the sidelink data or the sidelink logical channel, and/or the second remaining packet delay budget is determined or associated with the sidelink data or the sidelink logical channel, and/or the second remaining packet delay budget is the same or identical to the first remaining packet delay budget, and/or the second remaining packet delay budget is smaller than or equal to the first remaining packet delay budget.

In various embodiments, the first sidelink reference signal does not belong to a sidelink logical channel, and/or the first sidelink reference signal is multiplexed with the first sidelink data transmission on the first sidelink resource.

In various embodiments, the determination of the first time interval based on at least the first remaining packet delay budget comprises or means an upper bound timing or an ending timing of the first time interval is determined based on at least the first remaining packet delay budget.

In various embodiments, the method further comprises receiving or having a configuration of a second sidelink resource pool dedicated for the sidelink reference signal transmission; performing a second sensing-based resource selection, triggered or requested in a second timing, for selecting one or more second sidelink resources in the second sidelink resource pool; determining a second set of candidate resources within a second time interval, wherein the second time interval is determined based on at least a remaining delay budget associated with a second sidelink reference signal; determining a second subset of candidate resources after excluding some candidate resources from the second set of candidate resources based on one or more sensing results; selecting the one or more second sidelink resources from the second subset of candidate resources according to at least the remaining delay budget associated with the second sidelink reference signal; and performing transmission of the second sidelink reference signal on a second sidelink resource of the selected one or more second sidelink resources.

In various embodiments, the second sidelink resource pool comprises sidelink control resources, and/or the second sidelink resource pool does not comprise sidelink data resources.

In various embodiments, the first device determines the second time interval not based on any remaining packet delay budget.

In various embodiments, the sidelink data transmission means PSSCH transmission, and/or the sidelink reference signal means SL-PRS, and/or the sidelink reference signal means SL CSI-RS for beam management, and/or the sidelink reference signal is utilized for any of positioning, ranging, beam management, high-resolution localization, sensing, or imaging.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive or have a configuration of a first sidelink resource pool for sidelink data transmission and sidelink reference signal transmission; (ii) perform a first sensing-based resource selection, triggered or requested in a first timing, for selecting one or more first sidelink resources in the first sidelink resource pool; (iii) determine a first set of candidate resources within a first time interval, wherein the first time interval is determined based on at least a first remaining packet delay budget; (iv) determine a first subset of candidate resources after excluding some candidate resources from the first set of candidate resources based on one or more sensing results; (v) select the one or more first sidelink resources from the first subset of candidate resources according to at least a second remaining packet delay budget and a remaining delay budget associated with a first sidelink reference signal; and (vi) perform a first sidelink data transmission and transmission of the first sidelink reference signal on a first sidelink resource of the selected one or more first sidelink resources. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:
receiving or having a configuration of a first sidelink resource pool for sidelink data transmission and sidelink reference signal transmission;
performing a first sensing-based resource selection, triggered or requested in a first timing, for selecting one or more first sidelink resources in the first sidelink resource pool;
determining a first set of candidate resources within a first time interval, wherein the first time interval is determined based on at least a first remaining packet delay budget;
determining a first subset of candidate resources after excluding some candidate resources from the first set of candidate resources based on one or more sensing results;
selecting the one or more first sidelink resources from the first subset of candidate resources according to at least a second remaining packet delay budget and a remaining delay budget associated with a first sidelink reference signal; and
performing a first sidelink data transmission and transmission of the first sidelink reference signal on a first sidelink resource of the selected one or more first sidelink resources.

2. The method of claim 1, wherein the first device determines the first time interval not based on the remaining delay budget associated with the first sidelink reference signal.

3. The method of claim 1, wherein:
selecting the one or more first sidelink resources according to at least the second remaining packet delay budget and the remaining delay budget associated with the first sidelink reference signal comprises selecting the one or more first sidelink resources based on a shorter one of the second remaining packet delay budget and the remaining delay budget associated with the first sidelink reference signal, and/or
selecting the one or more first sidelink resources according to at least the second remaining packet delay budget and the remaining delay budget associated with the first sidelink reference signal comprises selecting the one or more first sidelink resources such that the one or more first sidelink resources are within the second remaining packet delay budget and within the remaining delay budget associated with the first sidelink reference signal, and/or
selecting the one or more first sidelink resources according to at least the second remaining packet delay budget and the remaining delay budget associated with the first sidelink reference signal comprises selecting the one or more first sidelink resources such that the one or more first sidelink resources are within the shorter one of the second remaining packet delay budget and the remaining delay budget associated with the first sidelink reference signal.

4. The method of claim 1, wherein:
the first sidelink data transmission includes a first sidelink data packet, which comprises sidelink data in or from a sidelink logical channel, and/or
the first remaining packet delay budget is determined or associated with the sidelink data or the sidelink logical channel, and/or
the second remaining packet delay budget is determined or associated with the sidelink data or the sidelink logical channel, and/or
the second remaining packet delay budget is the same or identical to the first remaining packet delay budget, and/or
the second remaining packet delay budget is smaller than or equal to the first remaining packet delay budget.

5. The method of claim 1, wherein:
the first sidelink reference signal does not belong to a sidelink logical channel, and/or
the first sidelink reference signal is multiplexed with the first sidelink data transmission on the first sidelink resource.

6. The method of claim 1, wherein:
the determination of the first time interval based on at least the first remaining packet delay budget comprises an upper bound timing or an ending timing of the first time interval is determined based on at least the first remaining packet delay budget.

7. The method of claim 1, further comprising:
receiving or having a configuration of a second sidelink resource pool dedicated for the sidelink reference signal transmission;
performing a second sensing-based resource selection, triggered or requested in a second timing, for selecting one or more second sidelink resources in the second sidelink resource pool;
determining a second set of candidate resources within a second time interval, wherein the second time interval is determined based on at least a remaining delay budget associated with a second sidelink reference signal;
determining a second subset of candidate resources after excluding some candidate resources from the second set of candidate resources based on one or more sensing results;
selecting the one or more second sidelink resources from the second subset of candidate resources according to at least the remaining delay budget associated with the second sidelink reference signal; and
performing transmission of the second sidelink reference signal on a second sidelink resource of the selected one or more second sidelink resources.

8. The method of claim 7, wherein:
the second sidelink resource pool comprises sidelink control resources, and/or
the second sidelink resource pool does not comprise sidelink data resources.

9. The method of claim 7, wherein the first device determines the second time interval not based on any remaining packet delay budget.

10. The method of claim 1, wherein:
the sidelink data transmission is Physical Sidelink Shared Channel (PSSCH) transmission, and/or
the sidelink reference signal is Sidelink Positioning Reference Signal (SL-PRS), and/or
the sidelink reference signal is SL Channel State Information Reference Signal (CSI-RS) for beam management, and/or
the sidelink reference signal is utilized for any of positioning, ranging, beam management, high-resolution localization, sensing, or imaging.

11. A first device, comprising:
a memory; and
a processor operatively coupled to the memory, wherein the processor is configured to execute a program code to:
receive or have a configuration of a first sidelink resource pool for sidelink data transmission and sidelink reference signal transmission;
perform a first sensing-based resource selection, triggered or requested in a first timing, for selecting one or more first sidelink resources in the first sidelink resource pool;
determine a first set of candidate resources within a first time interval, wherein the first time interval is determined based on at least a first remaining packet delay budget;
determine a first subset of candidate resources after excluding some candidate resources from the first set of candidate resources based on one or more sensing results;
select the one or more first sidelink resources from the first subset of candidate resources according to at least a second remaining packet delay budget and a remaining delay budget associated with a first sidelink reference signal; and
perform a first sidelink data transmission and transmission of the first sidelink reference signal on a first sidelink resource of the selected one or more first sidelink resources.

12. The first device of claim 11, wherein the first device determines the time interval not based on the remaining delay budget associated with the first sidelink reference signal.

13. The first device of claim 11, wherein:
selecting the one or more first sidelink resources according to at least the second remaining packet delay budget and the remaining delay budget associated with the first sidelink reference signal comprises selecting the one or more first sidelink resources based on a shorter one of the second remaining packet delay budget and the remaining delay budget associated with the first sidelink reference signal, and/or
selecting the one or more first sidelink resources according to at least the second remaining packet delay budget and the remaining delay budget associated with the first sidelink reference signal comprises selecting the one or more first sidelink resources such that the one or more first sidelink resources are within the second remaining packet delay budget and within the remaining delay budget associated with the first sidelink reference signal, and/or
selecting the one or more first sidelink resources according to at least the second remaining packet delay budget and the remaining delay budget associated with the first sidelink reference signal comprises selecting the one or more first sidelink resources such that the one or more first sidelink resources are within the shorter one of the second remaining packet delay budget and the remaining delay budget associated with the first sidelink reference signal.

14. The first device of claim 11, wherein:
the first sidelink data transmission includes a first sidelink data packet, which comprises sidelink data in or from a sidelink logical channel, and/or
the first remaining packet delay budget is determined or associated with the sidelink data or the sidelink logical channel, and/or
the second remaining packet delay budget is determined or associated with the sidelink data or the sidelink logical channel, and/or
the second remaining packet delay budget is the same or identical to the first remaining packet delay budget, and/or
the second remaining packet delay budget is smaller than or equal to the first remaining packet delay budget.

15. The first device of claim 11, wherein:
the first sidelink reference signal does not belong to a sidelink logical channel, and/or
the first sidelink reference signal is multiplexed with the first sidelink data transmission on the first sidelink resource.

16. The first device of claim 11, wherein:
the determination of the first time interval based on at least the first remaining packet delay budget comprises an upper bound timing or an ending timing of the first time interval is determined based on at least the first remaining packet delay budget.

17. The first device of claim 11, wherein the processor is further configured to execute the program code to:
receive or have a configuration of a second sidelink resource pool dedicated for the sidelink reference signal transmission;
perform a second sensing-based resource selection, triggered or requested in a second timing, for selecting one or more second sidelink resources in the second sidelink resource pool;
determine a second set of candidate resources within a second time interval, wherein the second time interval is determined based on at least a remaining delay budget associated with a second sidelink reference signal;
determine a second subset of candidate resources after excluding some candidate resources from the second set of candidate resources based on one or more sensing results;
select the one or more second sidelink resources from the second subset of candidate resources according to at least the remaining delay budget associated with the second sidelink reference signal; and
perform transmission of the second sidelink reference signal on a second sidelink resource of the selected one or more second sidelink resources.

18. The first device of claim 17, wherein:
the second sidelink resource pool comprises sidelink control resources, and/or
the second sidelink resource pool does not comprise sidelink data resources.

19. The first device of claim 17, wherein the first device determines the second time interval not based on any remaining packet delay budget.

20. The first device of claim 11, wherein:
the sidelink data transmission is Physical Sidelink Shared Channel (PSSCH) transmission, and/or
the sidelink reference signal is Sidelink Positioning Reference Signal (SL-PRS), and/or
the sidelink reference signal is SL Channel State Information Reference Signal (CSI-RS) for beam management, and/or
the sidelink reference signal is utilized for any of positioning, ranging, beam management, high-resolution localization, sensing, or imaging.

* * * * *